United States Patent
Akimoto et al.

(10) Patent No.: US 12,174,882 B2
(45) Date of Patent: Dec. 24, 2024

(54) IMAGE RETRIEVAL SYSTEM AND IMAGE RETRIEVAL METHOD

(71) Applicant: SEMICONDUCTOR ENERGY LABORATORY CO.LTD., Atsugi (JP)

(72) Inventors: Kengo Akimoto, Kanagawa (JP); Takahiro Fukutome, Kanagawa (JP); Kentaro Hayashi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 17/291,196

(22) PCT Filed: Nov. 6, 2019

(86) PCT No.: PCT/IB2019/059521
§ 371 (c)(1),
(2) Date: May 4, 2021

(87) PCT Pub. No.: WO2020/099985
PCT Pub. Date: May 22, 2020

(65) Prior Publication Data
US 2022/0075815 A1   Mar. 10, 2022

(30) Foreign Application Priority Data

Nov. 13, 2018   (JP) ................. 2018-212899

(51) Int. Cl.
*G06F 16/583* (2019.01)
*G06N 3/04* (2023.01)
(Continued)

(52) U.S. Cl.
CPC ............. *G06F 16/583* (2019.01); *G06N 3/04* (2013.01); *G06V 10/25* (2022.01); *G06V 10/751* (2022.01)

(58) Field of Classification Search
None
See application file for complete search history.

(56) References Cited

U.S. PATENT DOCUMENTS 9,767,381 B2   9/2017   Rodriguez-Serrano et al.
2016/0350886 A1*   12/2016   Jessen .................. G06Q 50/184
(Continued)

FOREIGN PATENT DOCUMENTS

EP   3147799 A   3/2017
JP   2005-284731 A   10/2005
(Continued)

OTHER PUBLICATIONS

International Search Report (Application No. PCT/IB2019/059521) Dated Feb. 10, 2020.

(Continued)

*Primary Examiner* — Giuseppi Giuliani
(74) *Attorney, Agent, or Firm* — NIXON PEABODY LLP; Jeffrey L. Costellia

(57) ABSTRACT

An image retrieval system that enables high-accuracy image retrieval in a short time is provided. The image retrieval system includes a processing portion provided with a neural network. The neural network includes a layer provided with a neuron. The processing portion has a function of comparing query image data with a plurality of pieces of database image data, and extracting the database image data including an area with a high degree of correspondence to the query image data as extracted image data. The processing portion has a function of extracting data of the area with a high degree of correspondence to the query image data from the extracted image data, as partial image data. The layer has a function of outputting an output value corresponding to the features of the image data input to the neural network. The processing portion has a function of comparing the above output values in the case where the respective pieces of (Continued)

partial image data are input with the above output value in the case where the query image data is input.

9 Claims, 16 Drawing Sheets

(51) Int. Cl.
*G06V 10/25* (2022.01)
*G06V 10/75* (2022.01)

(56) References Cited

U.S. PATENT DOCUMENTS

| | | | |
|---|---|---|---|
| 2017/0083792 A1 | 3/2017 | Rodriguez-Serrano et al. | |
| 2017/0330029 A1* | 11/2017 | Turcot | A61B 5/7267 |
| 2020/0387744 A1* | 12/2020 | Wang | G06N 3/084 |

FOREIGN PATENT DOCUMENTS

| | | |
|---|---|---|
| JP | 2016-018444 A | 2/2016 |
| JP | 2017-062781 A | 3/2017 |
| JP | 2018-124740 A | 8/2018 |
| JP | 2018-160086 A | 10/2018 |
| WO | WO-2018/179338 | 10/2018 |

OTHER PUBLICATIONS

Written Opinion (Application No. PCT/IB2019/059521) Dated Feb. 10, 2020.

* cited by examiner

IMAGE RETRIEVAL SYSTEM AND IMAGE RETRIEVAL METHOD

TECHNICAL FIELD

One embodiment of the present invention relates to an information retrieval system and an information retrieval method.

Note that one embodiment of the present invention is not limited to the above technical field. Examples of the technical field of one embodiment of the present invention include a semiconductor device, a display device, a light-emitting device, a power storage device, a memory device, an electronic device, a lighting device, a method for driving any of them, and a method for manufacturing any of them.

BACKGROUND ART

Methods called template matching have been used to find an image partly including an image similar to the image to be retrieved (query image) from a database storing a vast number of images. For example, Patent Document 1 describes an invention in which template matching is performed on part of a verification image and a reference image to calculate similarity degree between both images.

Use of artificial intelligence is under consideration for various applications. In particular, a computer having a higher performance than a conventional Neumann computer is expected to be provided by utilizing the neural network or the like, and in these years, a variety of researches on a neural network formed over an electronic circuit have been carried out.

For example, Patent Document 2 discloses an invention in which matrix data for convolution operation in a convolutional neural network is divided into two parts, the former part and the latter part with reference to the threshold to reduce the amount of arithmetic operation.

REFERENCES

Patent Documents

[Patent Document 1] Japanese Published Patent Application No. 2005-284731
[Patent Document 2] Japanese Published Patent Application No. 2018-160086

SUMMARY OF THE INVENTION

Problems to be Solved by the Invention

Feature-based matching and area-based matching can be given as methods of template matching. In feature-based matching, matching between images is performed by extraction of feature points from the images and calculation of features. In area-based matching, images to be a template (template images) are compared with the query image one by one, whereby the template image partly including an image similar to the query image is extracted.

However, it may take time to extract the feature points in feature-based matching. In addition, area-based matching is poor at change in the shape of images, in particular, and may fail in high-accuracy image retrieval.

An object of one embodiment of the present invention is to provide an image retrieval system that enables high-accuracy image retrieval. Another object of one embodiment of the present invention is to provide an image retrieval system that enables image retrieval in a short time. Another object of one embodiment of the present invention is to provide a novel image retrieval system.

Another object of one embodiment of the present invention is to provide an image retrieval method that enables high-accuracy image retrieval. Another object of one embodiment of the present invention is to provide an image retrieval method that enables image retrieval in a short time. Another object of one embodiment of the present invention is to provide a novel image retrieval method.

Note that the description of these objects does not preclude the existence of other objects. One embodiment of the present invention does not need to achieve all these objects. Other objects can be derived from the descriptions of the specification, the drawings, and the claims.

Means for Solving the Problems

One embodiment of the present invention is an image retrieval system including a processing portion. The processing portion includes a neural network. The neural network includes an intermediate layer. The intermediate layer has a function of outputting a first output value corresponding to the first image data when the first image data is input to the neural network. The intermediate layer has a function of outputting a second output value corresponding to the second image data when the second image data is input to the neural network. The processing portion has a function of comparing the first output value with the second output value.

One embodiment of the present invention is an image retrieval system including a processing portion. The processing portion includes a neural network. The neural network includes a convolutional layer and a pooling layer. The pooling layer has a function of outputting a first output value corresponding to the first image data when the first image data is input to the neural network. The pooling layer has a function of outputting a second output value corresponding to the second image data when the second image data is input to the neural network. The processing portion has a function of comparing the first output value with the second output value.

One embodiment of the present invention is an image retrieval system including a processing portion. The processing portion includes a neural network. The neural network includes a convolutional layer and an intermediate layer. The processing portion has a function of comparing image data with a plurality of pieces of database image data when the image data and the database image data are input to the processing portion. The processing portion has a function of extracting the database image data including an area with a high degree of correspondence to the image data as extracted image data. The intermediate layer has a function of outputting a first output value corresponding to the image data when the image data is input to the neural network. The intermediate layer has a function of outputting a second output value corresponding to the extracted image data when the extracted image data is input to the neural network. The processing portion has a function of comparing the first output value with the second output value.

One embodiment of the present invention is an image retrieval system including a processing portion. The processing portion includes a neural network. The neural network includes a convolutional layer and an intermediate layer. The processing portion has a function of comparing image data with a plurality of pieces of database image data when the image data and the database image data are input to the processing portion. The processing portion has a function of extracting the database image data including an area with a high degree of correspondence to the image data as extracted image data. A pooling layer has a function of outputting a first output value corresponding to the image data when the image data is input to the neural network. The pooling layer has a function of outputting a second output value corresponding to the extracted image data when the extracted image data is input to the neural network. The processing portion has a function of comparing the first output value with the second output value.

One embodiment of the present invention is an image retrieval system including a processing portion. The processing portion includes a neural network. The neural network includes an intermediate layer. The processing portion has a function of comparing image data with a plurality of pieces of database image data when the image data and the database image data are input to the processing portion. The processing portion has a function of extracting the database image data including an area with a high degree of correspondence to the image data as extracted image data. The processing portion has a function of extracting data of the area with a high degree of correspondence to the image data as partial image data from the extracted image data. The intermediate layer has a function of outputting a first output value corresponding to the image data when the image data is input to the neural network. The intermediate layer has a function of outputting a second output value corresponding to the partial image data when the partial image data is input to the neural network. The processing portion has a function of comparing the first output value with the second output value.

One embodiment of the present invention is an image retrieval system including a processing portion. The processing portion includes a neural network. The neural network includes a convolutional layer and a pooling layer. The processing portion has a function of comparing image data with a plurality of pieces of database image data when the image data and the database image data are input to the processing portion. The processing portion has a function of extracting the database image data including an area with a high degree of correspondence to the image data as extracted image data. The processing portion has a function of extracting data of the area with a high degree of correspondence to the image data as partial image data from the extracted image data. The pooling layer has a function of outputting a first output value corresponding to the image data when the image data is input to the neural network. The pooling layer has a function of outputting a second output value corresponding to the partial image data when the partial image data is input to the neural network. The processing portion has a function of comparing the first output value with the second output value.

The number of pieces of pixel data included in the image data may be less than or equal to the number of pieces of pixel data included in the database image data.

The image data may be compared with the database image data by area-based matching.

The image data may include a plurality of pieces of the pixel data, and the processing portion may have a function of generating a plurality of pieces of the image data, which are different in the number of the pieces of the pixel data to be provided, on the basis of the input image data.

The neural network may have a function of performing learning using the database image data.

One embodiment of the present invention is an image retrieval method in which first image data is input to a neural network including an intermediate layer so that a first output value output from the intermediate layer is acquired, second image data is input to the neural network so that a second output value output from the intermediate layer is acquired, and the first output value and the second output value are compared.

One embodiment of the present invention is an image retrieval method in which first image data is input to a neural network including a convolutional layer and a pooling layer so that a first output value output from the pooling layer is acquired, second image data is input to the neural network so that a second output value output from the pooling layer is acquired, and the first output value and the second output value are compared.

One embodiment of the present invention is an image retrieval method in which image data is compared with a plurality of pieces of database image data, database image data including an area with a high degree of correspondence to the image data is extracted as extracted image data, the image data is input to a neural network including an intermediate layer so that a first output value output from a layer is acquired, the extracted image data is input to the neural network so that a second output value output from the intermediate layer is acquired, and the first output value and the second output value are compared.

One embodiment of the present invention is an image retrieval method in which image data is compared with a plurality of pieces of database image data, database image data including an area with a high degree of correspondence to the image data is extracted as extracted image data, the image data is input to a neural network including a convolutional layer and a pooling layer so that a first output value output from a layer is acquired, the extracted image data is input to the neural network so that a second output value output from the pooling layer is acquired, and the first output value and the second output value are compared.

One embodiment of the present invention is an image retrieval method in which image data is compared with a plurality of pieces of database image data, database image data including an area with a high degree of correspondence to the image data is extracted as extracted image data, data of the area with a high degree of correspondence to the image data is extracted as partial image data from the extracted image data, the image data is input to a neural network including an intermediate layer so that a first output value output from the intermediate layer is acquired, the partial image data is input to the neural network so that a second output value output from the intermediate layer is acquired, and the first output value and the second output value are compared.

One embodiment of the present invention is an image retrieval method in which image data is compared with a plurality of pieces of database image data, database image data including an area with a high degree of correspondence to the image data is extracted as extracted image data, data of the area with a high degree of correspondence to the image data is extracted as partial image data from the extracted image data, the image data is input to a neural network including a convolutional layer and a pooling layer so that a first output value output from the pooling layer is acquired, the partial image data is input to the neural network so that a second output value output from the pooling layer is acquired, and the first output value and the second output value are compared.

The number of pieces of pixel data included in the image data may be less than or equal to the number of pieces of pixel data included in the database image data.

The image data may be compared with the database image data by area-based matching.

The image data may include a plurality of pieces of pixel data, and the image data may be compared with database image data after a plurality of pieces of the image data, which are different in the number of the pieces of the pixel data to be provided, is generated on the basis of the image data.

The neural network may perform learning using the database image data.

Effect of the Invention

According to one embodiment of the present invention, an image retrieval system that enables high-accuracy image retrieval can be provided. According to another embodiment of the present invention, an image retrieval system that enables image retrieval in a short time can be provided. According to another embodiment of the present invention, a novel image retrieval system can be provided.

According to another embodiment of the present invention, an image retrieval method that enables high-accuracy image retrieval can be provided. According to another embodiment of the present invention, an image retrieval method that enables image retrieval in a short time can be provided. According to another embodiment of the present invention, a novel image retrieval method can be provided.

Note that the description of the effects does not preclude the existence of other effects. One embodiment of the present invention does not need to have all these effects. Other effects can be derived from the descriptions of the specification, the drawings, and the claims.

BRIEF DESCRIPTION OF THE DRAWINGS

FIG. 5A, FIG. 5B1, and FIG. 5B2 are diagrams showing an example of an image retrieval method.

MODE FOR CARRYING OUT THE INVENTION

Figure 1:
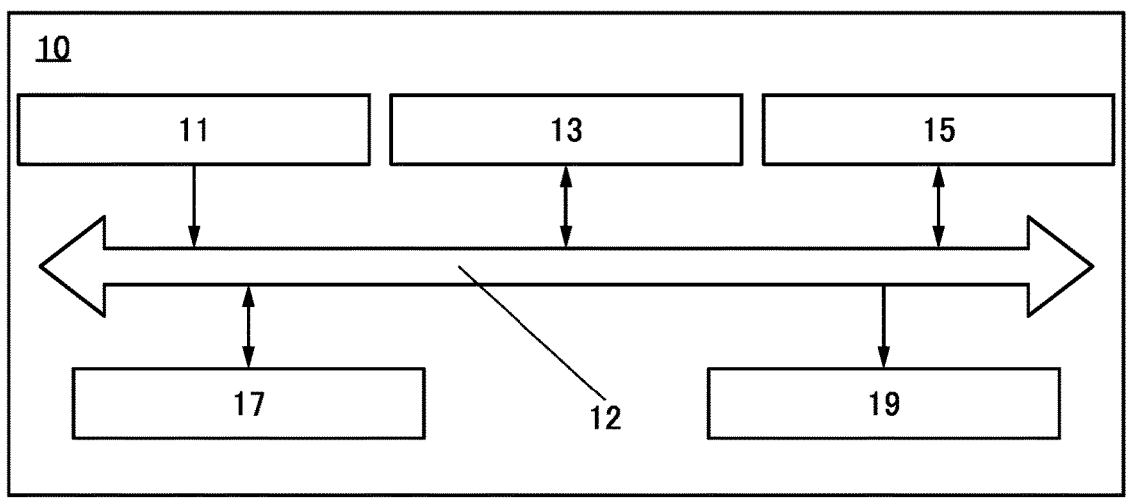
FIG. 1 is a block diagram showing a structure example of an image retrieval system.

Embodiments are described in detail with reference to the drawings. Note that the present invention is not limited to the following description, and it will be readily appreciated by those skilled in the art that modes and details of the present invention can be modified in various ways without departing from the spirit and scope of the present invention. Thus, the present invention should not be construed as being limited to the description in the following embodiments.

Note that in structures of the present invention described below, the same portions or portions having similar functions are denoted by the same reference numerals in different drawings, and a description thereof is not repeated. The same hatch pattern is used for the portions having similar functions, and the portions are not especially denoted by reference numerals in some cases.

Embodiment

In this embodiment, an image retrieval system and an image retrieval method of one embodiment of the present invention will be described.

An image retrieval system of one embodiment of the present invention includes a processing portion and a database. The processing portion includes a neural network, and the neural network includes a layer provided with neurons.

In this specification and the like, the neural network indicates a general model having the capability of solving problems, which is modeled on a biological neural network and determines the connection strength of neurons by the learning.

In the description of the neural network in this specification and the like, to determine a connection strength of neurons (also referred to as weight coefficient) from the existing information is referred to as "leaning".

In this specification and the like, to draw a new conclusion from the neural network formed with the connection strength obtained by the learning is called "inference".

Query image data representing a query image and database image data stored in a database are input to the processing portion. A user of the image retrieval system of one embodiment of the present invention inputs the query image to the processing portion. Here, the number of pixels of the query image can be less than or equal to the number of pixels of a database image, for example. The image retrieval system of one embodiment of the present invention has a function of retrieving the database image including an image similar to the query image.

The processing portion has a function of, for example, comparing one piece of query image data with a plurality of pieces of database image data. Specifically, first, the query image data and the database image data are compared by area-based matching or the like, whereby the degree of correspondence to the query image data is calculated for each area of the database image data. Next, the database image data including an area with a high correspondence degree is extracted as extracted image data. From the extracted image data, partial image data, which is data of the area with a high degree of correspondence to the query image data, is then extracted.

In this specification and the like, one piece of image data means image data corresponding to one image, for example.

Next, the query image data and the partial image data are input to the neural network included in the processing portion. Thus, the processing portion can acquire output values output from a layer included in the neural network. The output values output from the layer included in the neural network represent features of the image data input to the neural network, for example.

Then, the above output values in the case where the respective pieces of partial image data are input are compared with the above output value in the case where the query image data is input. Thus, the degree of similarity to the query image data can be calculated as a numerical value for each partial image data. Consequently, the degree of similarity to the query image data can be calculated as a numerical value for each extracted image data.

In the image retrieval system of one embodiment of the present invention, the above similarity can be calculated with high accuracy in a short time by comparison between the output values output from the layer included in the neural network as described above. Accordingly, the database image partly including an image similar to the query image can be retrieved with high accuracy as compared with the case where the query image and the database image are compared only by area-based matching, for example. The database image partly including an image similar to the query image can be retrieved in a short time as compared with the case where the query image and the database image are compared only by feature-based matching, for example. Furthermore, since the above similarity can be calculated as a numerical value, the degrees of correspondence of the database images to the query image can be ranked, for example.

<1. Image Retrieval System>

FIG. 1 is a block diagram showing a structure example of an image retrieval system 10. The image retrieval system 10 includes at least a processing portion 13. The image retrieval system 10 illustrated in FIG. 1 further includes an input portion 11, a transmission path 12, a memory portion 15, a database 17, and an output portion 19.

[Input Portion 11]

To the input portion 11, image data or the like is supplied from the outside of the image retrieval system 10. The image data or the like supplied to the input portion 11 is supplied to the processing portion 13, the memory portion 15, or the database 17 through the transmission path 12.

[Transmission Path 12]

The transmission path 12 has a function of transmitting the image data or the like. Transmission and reception of information between the input portion 11, the processing portion 13, the memory portion 15, the database 17, and the output portion 19 can be performed through the transmission path 12.

[Processing Portion 13]

The processing portion 13 has a function of performing arithmetic operation, inference, or the like with use of the image data or the like supplied from the input portion 11, the memory portion 15, the database 17, or the like. The processing portion 13 includes the neural network and can perform arithmetic operation, inference, or the like using the neural network. The processing portion 13 can also perform arithmetic operation or the like without using the neural network. The processing portion 13 can supply an arithmetic operation result, an inference result, or the like to the memory portion 15, the database 17, the output portion 19, or the like.

A transistor including a metal oxide in a channel formation region is preferably used in the processing portion 13. The transistor has an extremely low off-state current; therefore, with the use of the transistor as a switch for retaining charge (data) which flows into a capacitor functioning as a memory element, a long data retention period can be ensured. When at least one of a register and a cache memory included in the processing portion 13 has such a feature, the processing portion 13 can be operated only when needed, and otherwise can be off while information processed immediately before turning off the processing portion 13 is stored in the memory element; accordingly, normally-off computing is possible and the power consumption of the image retrieval system can be reduced.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases. That is to say, a metal oxide that has at least one of an amplifying function, a rectifying function, and a switching function can be referred to as metal oxide semiconductor, or OS for short.

In this specification and the like, a transistor including an oxide semiconductor or a metal oxide in its channel formation region is referred to as an oxide semiconductor transistor or an OS transistor.

The metal oxide in the channel formation region preferably contains indium (In). The metal oxide in the channel formation region that contains indium increases the carrier mobility (electron mobility) of the OS transistor. The metal oxide in the channel formation region is preferably an oxide semiconductor containing an element M. The element M is preferably aluminum (Al), gallium (Ga), tin (Sn), or the like. Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that two or more of the above elements can be used in combination as the element M in some cases. The element M is an element having high bonding energy with oxygen, for example. The element M is an element whose bonding energy with oxygen is higher than that of indium, for example. The metal oxide included in the channel formation region is preferably a metal oxide containing zinc (Zn). The metal oxide containing zinc is easily crystallized in some cases.

The metal oxide in the channel formation region is not limited to a metal oxide containing indium. The semiconductor layer may be, for example, a metal oxide that does not contain indium but contains at least one of zinc, gallium, and tin (e.g., zinc tin oxide or gallium tin oxide).

The processing portion 13 includes, for example, an operation circuit, a central processing unit (CPU), or the like.

The processing portion 13 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing portion 13 can interpret and execute instructions from programs to process various kinds of data and control programs. The programs to be executed by the processor are stored in at least one of a memory region of the processor or the memory portion 15.

The processing portion 13 may include a main memory. The main memory includes at least one of a volatile memory such as a RAM (Random Access Memory) and a nonvolatile memory such as a ROM (Read Only Memory).

For example, a DRAM (dynamic random access memory) or an SRAM (static random access memory) is used as the RAM, in which case a virtual memory space is assigned to the RAM to be used as a work space for the processing portion 13. An operating system, an application program, a program module, program data, a look-up table, and the like which are stored in the memory portion 15 are loaded into the RAM and executed. The data, program, and program module which are loaded into the RAM are each directly accessed and operated by the processing portion 13.

In the ROM, a BIOS (Basic Input/Output System), firmware, and the like for which rewriting is not needed can be stored. As the ROM, a mask ROM, an OTPROM (One Time Programmable Read Only Memory), an EPROM (Erasable Programmable Read Only Memory), and the like can be given. As the EPROM, a UV-EPROM (Ultra-Violet Erasable Programmable Read Only Memory) which can erase stored data by ultraviolet irradiation, an EEPROM (Electrically Erasable Programmable Read Only Memory), a flash memory, and the like can be given.

[Memory Portion 15]

The memory portion 15 has a function of storing a program to be executed by the processing portion 13. The memory portion 15 may have a function of storing an arithmetic result and an inference result generated by the processing portion 13, the image data or the like input to the input portion 11, and the like.

The memory portion 15 includes at least one of a volatile memory and a nonvolatile memory. For example, the memory portion 15 may include a volatile memory such as a DRAM or an SRAM. For example, the memory portion 15 may include a nonvolatile memory such as an ReRAM (Resistive Random Access Memory also referred to as a resistance-change memory), a PRAM (Phase change Random Access Memory), an FeRAM (Ferroelectric Random Access Memory), or a MRAM (Magnetoresistive Random Access Memory, also referred to a magneto-resistive memory), or a flash memory. The memory portion 15 may include storage media drives such as a hard disk drive (Hard Disc Drive: HDD) and a solid state drive (SSD).

[Database 17]

The database 17 has a function of storing reference image data. The database 17 may have a function of storing an arithmetic result and an inference result generated by the processing portion 13 and the image data or the like input to the input portion 11. Note that the memory portion 15 and the database 17 are not necessarily separated from each other. For example, the image retrieval system 10 may include a storage unit that has both the functions of the memory portion 15 and that of the database 17.

In this specification and the like, image data stored in a database or the like is referred to as database image data. An image corresponding to the database image data is referred to as a database image.

[Output Portion 19]

The output portion 19 has a function of supplying information to the outside of the image retrieval system 10. For example, an arithmetic result, an inference result, or the like in the processing portion 13 can be supplied to the outside.

[2. Image Retrieval Method 1]

Figure 2:
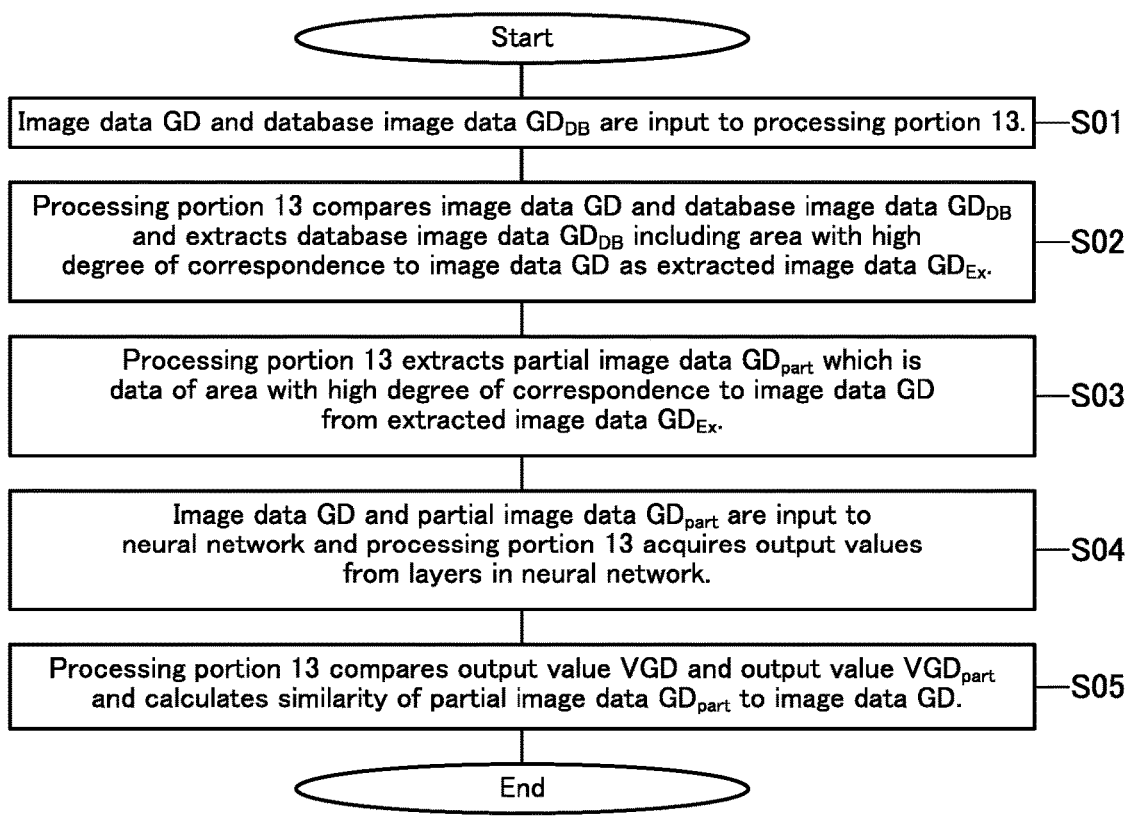
FIG. 2 is a flow chart showing an example of an image retrieval method.

FIG. 2 is a flow chart showing an example of an image retrieval method using the image retrieval system 10.

[Step S01]

First, image data GD and database image data $GD_{DB}$ are input to the processing portion 13.

The image data GD is input to the input portion 11 from the outside of the image retrieval system 10. After that, the image data GD is supplied from the input portion 11 to the processing portion 13 through the transmission path 12; or the image data GD transmitted through the transmission path 12 may be stored in the memory portion 15 or the database 17, and supplied from the memory portion 15 or the database 17 to the processing portion 13 through the transmission path 12.

The database image data $GD_{DB}$ is supplied from the database 17 to the processing portion 13 through the transmission path 12. Alternatively, the database image data $GD_{DB}$ may be supplied from the memory portion 15 to the processing portion 13 through the transmission path 12.

Here, the image data GD can be referred to as query image data, for example. The number of pixels of an image corresponding to the image data GD can be less than or equal to the number of pixels of a database image. That is, the number of pixels of the query image can be less than or equal to the number of pixels of the database image. The image retrieval system 10 can retrieve the database image partly including an image similar to the image corresponding to the image data GD. That is, the image retrieval system 10 can retrieve the database image partly including an image similar to the query image, for example.

As the image data GD and the database image data $GD_{DB}$, data representing a drawing included in intellectual property information can be used. Here, examples of the intellectual property information are publications such as a patent document (e.g., published application publication, and a patent publication), a utility model publication, a design publication, and a paper. Not only publications issued domestically but also those issued in foreign countries can be used as the intellectual property information The intellectual property information is not limited to publications. For example, a variety of files such as an image file independently possessed by a user or a user group of the image retrieval system can also be used as the image data GD or the database image data $GD_{DB}$.

A drawing and the like illustrating an invention, a device, or a design can also be given as the intellectual property information. These are also suitable as both the image data GD and the database image data $GD_{DB}$.

The image data GD can be data corresponding to a drawing illustrating an invention, a device, or a design before filing, for example.

The database image data $GD_{DB}$ can include, for example, data representing a drawing described in a patent document of a specific applicant or data representing a drawing described in a patent document of a specific technical field.

With the use of the image retrieval system 10, a patent document, a paper, or an industrial product that is similar to an invention before filing can be retrieved, for example. Thus, prior art relating to the invention before filing can be retrieved. Knowing and reviewing relevant prior art strengthens the invention, leading to a strong patent that other companies are highly likely to infringe.

For example, a patent document, a paper, or an industrial product before sale can be retrieved by the image retrieval system 10. When the database image data $GD_{DB}$ includes data corresponding to images described in one's own patent documents, whether patent applications are appropriately filed in association with technologies for the one's own industrial product before sale can be confirmed. When the database image data $GD_{DB}$ includes data corresponding to images described in others' patent documents, whether or not the one's own industrial product before sale infringes the others' intellectual property right can be confirmed. Knowing and reviewing relevant prior art leads to discovery of a novel invention that is to be a strong patent contributing to one's own business. Note that retrieval of an industrial product after sale may be conducted as well as retrieval of an industrial product before sale.

For example, a patent document, a paper, or an industrial product that is similar to a specific patent can be retrieved by the image retrieval system 10. In particular, search based on the filing date of the specific patent can reveal easily and accurately whether or not the patent includes grounds for invalidation.

[Step S021]

Next, the processing portion 13 compares the image data GD with the database image data $GD_{DB}$ to extract the database image data $GD_{DB}$ including an area with a high degree of correspondence to the image data GD. Here, the database image data $GD_{DB}$ extracted is referred to as extracted image data $GD_{Ex}$. The comparison between the image data GD and the database image data $GD_{DB}$ can be performed by area-based matching, for example.

Figure 3A:
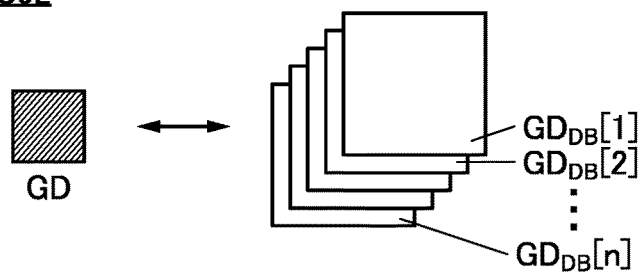
FIG. 3A and FIG. 3B are diagrams showing an example of an image retrieval method.

An operation example of Step S02 is described in detail with reference to FIG. 3 to FIG. 5. In Step S02, the image data GD is compared with each of n pieces (n is an integer greater than or equal to 1) of the database image data $GD_{DB}$, as illustrated in FIG. 3A. Here, n may be less than or equal to the number of the pieces of the database image data $GD_{DB}$ stored in the database 17. Also, n may be greater than the number of the pieces of the database image data $GD_{DB}$ stored in the database 17. In this case, the image data GD is compared with the image data stored in the memory portion 15 and/or the image data input from the outside of the image retrieval system 10 to the processing portion 13 through the input portion 11 as well as the database image data $GD_{DB}$ stored in the database 17. Note that even when n is less than or equal to the number of the database image data $GD_{DB}$, the image data GD may be compared with the image data stored in the memory portion 15 and/or the image data input from the outside of the image retrieval system 10 to the processing portion 13 through the input portion 11.

In the case where n is small, the operation of Step S02 can be performed in a short time. By contrast, in the case where n is large, the database image data $GD_{DB}$ including an area with a high degree of correspondence to the image data GD can be extracted with high accuracy.

In this specification and the like, [1], [2], and the like are sometimes added to the end of the reference numerals to distinguish a plurality of components. For example, then pieces of the database image data $GD_{DB}$ are distinguished by denotation of database image data $GD_{DB}[1]$, database image data $GD_{DB}[2]$, and database image data $GD_{DB}[n]$ in FIG. 3A.

Figure 3B:
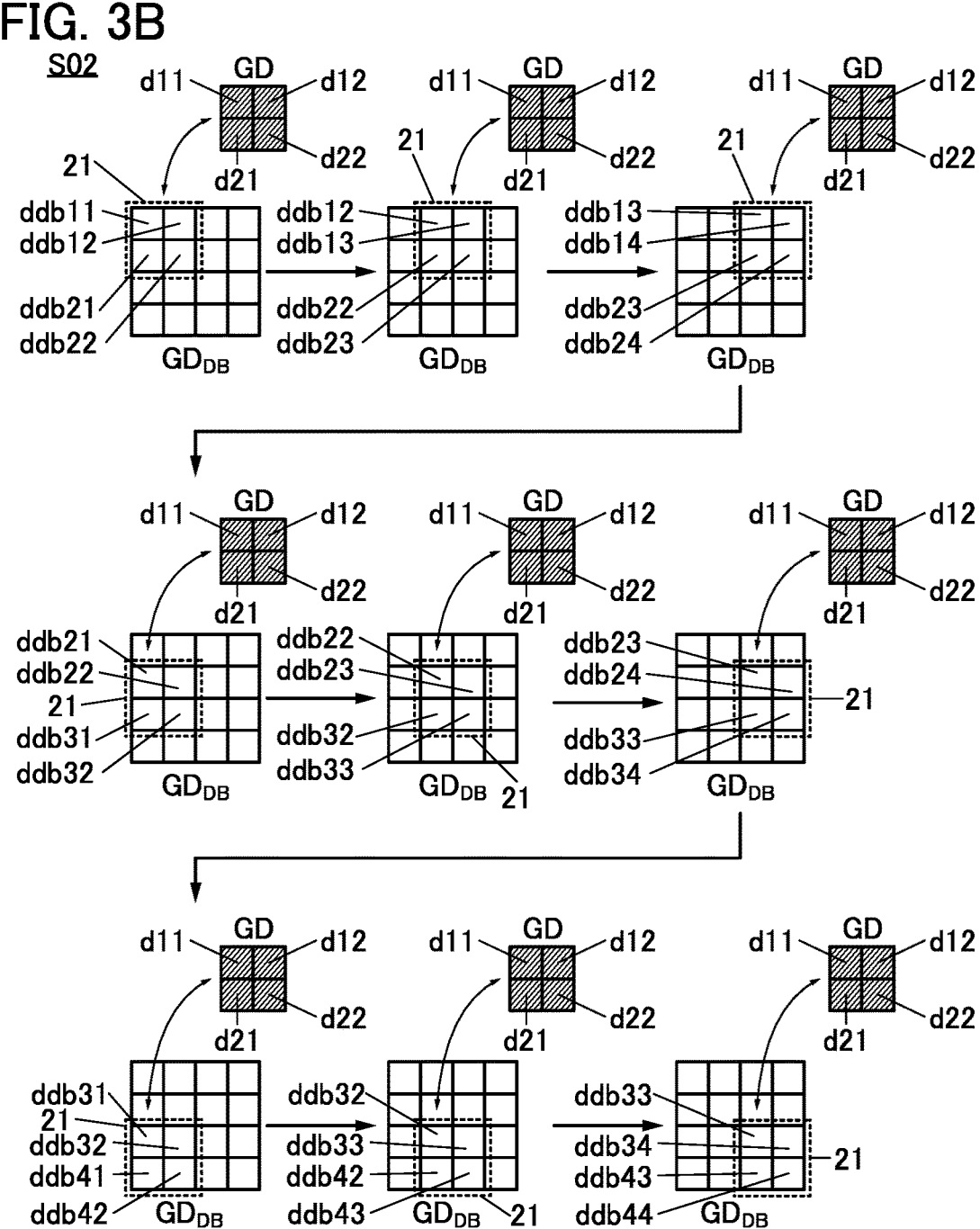

FIG. 3B is a diagram illustrating a procedure in which the image data GD and the database image data $GD_{DB}$ are compared by area-based matching. Here, the number of pixels of the image corresponding to the image data GD is 2×2 and the number of pixels of an image corresponding to the database image data $GD_{DB}$ is 4×4. In other words, the image data GD includes 2×2 pieces of pixel data and the database image data $GD_{DB}$ includes 4×4 pieces of pixel data.

In FIG. 3B, the 2×2 pieces of pixel data included in the image data GD is referred to as pixel data d11, pixel data d12, pixel data d21, and pixel data d22. In the image data GD, the pixel data d11 is pixel data corresponding to a pixel in a first row and a first column, the pixel data d12 is pixel data corresponding to a pixel in the first row and a second column, the pixel data d21 is pixel data corresponding to a pixel in a second row and the first column, and the pixel data d22 is pixel data corresponding to a pixel in the second row and the second column, for example. The 4×4 pieces of pixel data included in the database image data $GD_{DB}$ is referred to as pixel data ddb11 to pixel data ddb44. In the database image data $GD_{DB}$, the pixel data ddb11 is pixel data corresponding to a pixel in a first row and a first column, the pixel data ddb14 is pixel data corresponding to a pixel in the first row and a fourth column, the pixel data ddb41 is pixel data corresponding to a pixel in a fourth row and the first column, and the pixel data ddb44 is pixel data corresponding to a pixel in the fourth row and the fourth column, for example.

In this specification and the like, pixel data means data representing the luminance of each pixel. For example, in the case where pixel data has 8 bits, the luminance of each pixel can be represented by 256 gray levels. Image data can be said to include a set of pixel data and the number of pieces of pixel data can be equal to the number of pixels, for example. It can be said that in the case where the number of pixels of an image is 2×2, image data representing the image includes 2×2 pieces of pixel data, for example.

First, the pixel data d11, the pixel data d12, the pixel data d21, and the pixel data d22 are compared with the pixel data ddb11, the pixel data ddb12, the pixel data d21, and the pixel data ddb22. Consequently, the degree of correspondence between the image data GD and an area formed of the pixel data ddb11, the pixel data ddb12, the pixel data ddb21, and the pixel data ddb22 in the database image data $GD_{DB}$ can be calculated. Note that in FIG. 3B, pixel data compared with the image data GD, which are among the pixel data included in the database image data $GD_{DB}$, are referred to as a compared data area 21 surrounded by a dashed line.

Next, the compared data area 21 slides one column at a time in the pixel data included in the database image data $GD_{DB}$, and comparison between the pixel data is performed as described above to calculate correspondence degree. Specifically, the pixel data d11, the pixel data d12, the pixel data d21, and the pixel data d22 are compared with the pixel data ddb12, the pixel data ddb13, the pixel data ddb22, and the pixel data ddb23. Consequently, the degree of correspondence between the image data GD and an area formed of the pixel data ddb12, the pixel data ddb13, the pixel data ddb22, and the pixel data ddb23 in the database image data $GD_{DB}$ can be calculated.

After that, the compared data area 21 slides one column at a time in the pixel data included in the database image data $GD_{DB}$, and comparison between the pixel data is performed as described above to calculate correspondence degree. Specifically, the pixel data d11, the pixel data d12, the pixel data d21, and the pixel data d22 are compared with the pixel data ddb13, the pixel data ddb14, the pixel data ddb23, and the pixel data ddb24. Consequently, the degree of correspondence between the image data GD and an area formed of the pixel data ddb13, the pixel data ddb14, the pixel data ddb23, and the pixel data ddb24 in the database image data $GD_{DB}$ can be calculated.

Next, the compared data area 21 slides one row at a time in the pixel data included in the database image data $GD_{DB}$, and pixel data in the second row and pixel data in the third row in the pixel data included in the database image data $GD_{DB}$ are compared with the image data GD as described above for each column. Consequently, the degree of correspondence between the image data GD and the pixel data in the second row and the third row included in the database image data $GD_{DB}$ can be calculated as described above for each column.

After that, the compared data area 21 slides one row at a time in the pixel data included in the database image data $GD_{DB}$, and pixel data in the third row and pixel data in the fourth row in the pixel data included in the database image data $GD_{DB}$ are compared with the image data GD as described above for each column. Consequently, the degree of correspondence between the image data GD and the pixel data in the third row and the fourth row included in the database image data $GD_{DB}$ can be calculated as described above for each column.

After the above operation is performed, the highest correspondence degree is regarded as the degree of correspondence of the database image data $GD_{DB}$ to the image data GD, for example. The above is performed for each of the n pieces of the database image data $GD_{DB}$. After that, the database image data $GD_{DB}$ with a high degree of correspondence to the image data GD is extracted as the extracted image data $GD_{Ex}$ from the n pieces of the database image data $GD_{DB}$. For example, a prescribed number of pieces of the database image data $GD_{DB}$ may be extracted as the extracted image data $GD_{Ex}$ in descending order of the correspondence degree. Alternatively, for example, the database image data $GD_{DB}$ with a degree of correspondence to the image data GD, which is higher than or equal to a prescribed value, may be extracted as the extracted image data $GD_{Ex}$.

The extraction of the database image data $GD_{DB}$ may be omitted. In other words, the database image data $GD_{DB}$ compared with the image data GD can all be the extracted image data $GD_{Ex}$.

Figure 4:
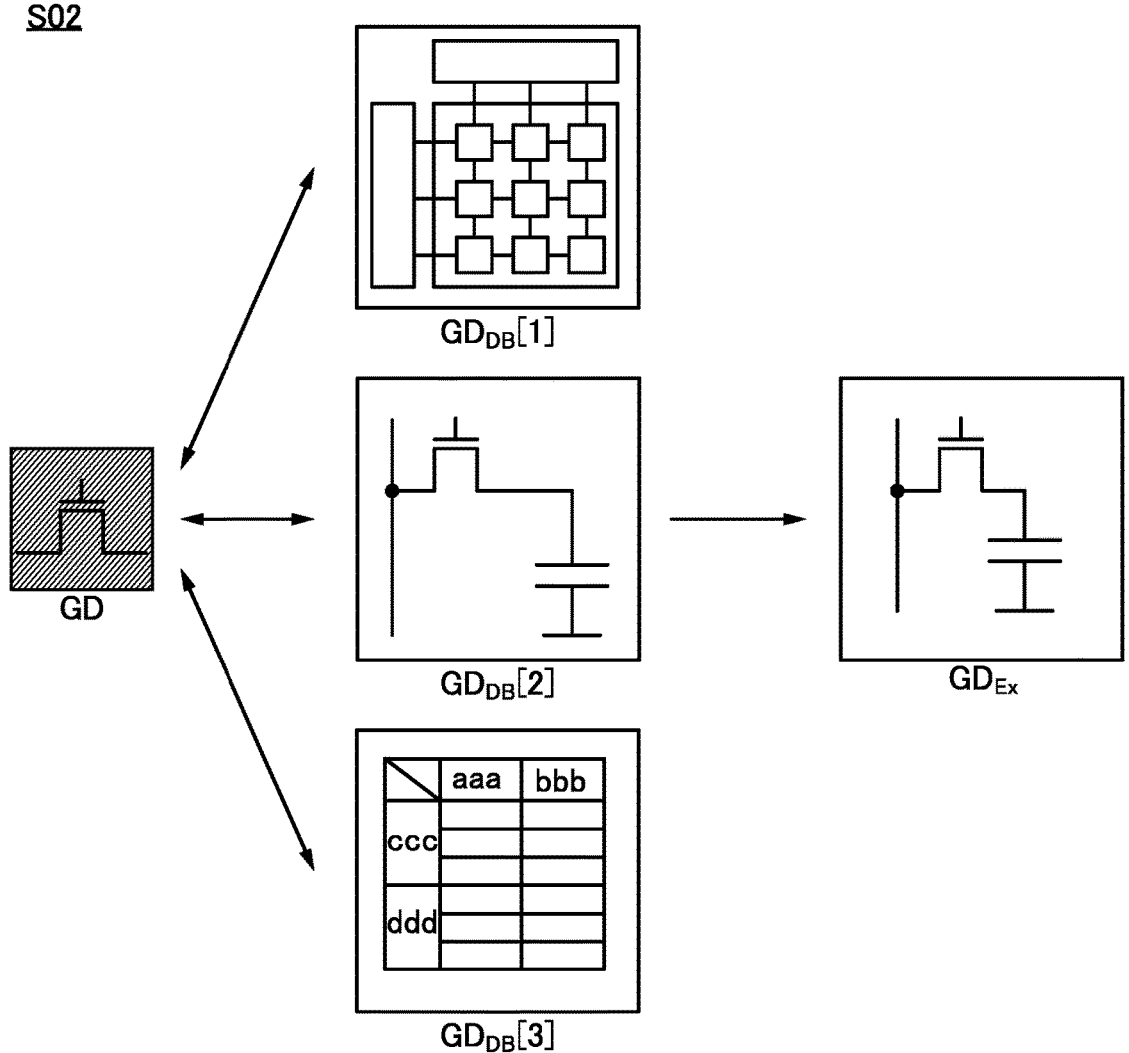
FIG. 4 is a diagram showing an example of an image retrieval method.

FIG. 4 is a drawing showing the extraction of the database image data $GD_{DB}$. FIG. 4 shows the case where one piece of image data is extracted as the extracted image data $GD_{Ex}$ from the database image data $GD_{DB}[1]$ to the database image data $GD_{DB}[3]$.

An image corresponding to the image data GD illustrated in FIG. 4 includes a transistor symbol, for example. An image corresponding to the database image data $GD_{DB}[2]$ illustrated in FIG. 4 includes a transistor symbol, while an image corresponding to the database image data $GD_{DB}[1]$ and an image corresponding to the database image data $GD_{DB}[3]$ do not include a transistor symbol. In this case, the degree of correspondence of the database image data $GD_{DB}[2]$ to the image data GD is higher than the degrees of correspondence of the database image data $GD_{DB}[1]$ and the database image data $GD_{DB}[3]$ to the image data GD. Thus, the database image data $GD_{DB}[2]$ can be extracted as the extracted image data $GD_{Ex}$.

Note that comparison between the image data GD and the database image data $GD_{DB}$ and calculation of the correspondence degree can be performed by SAD (Sum of Absolute Differences), SSD (Sum of Squared Differences), NCC (Normalized Cross Correlation), ZNCC (Zero-mean Normalized Cross Correlation), POC (Phase-Only Correlation), or the like.

Although the compared data area 21 slides one column or one row at a time in the pixel data included in the database image data $GD_{DB}$ in FIG. 3B, one embodiment of the present invention is not limited thereto. The compared data area 21 may slide two or more columns or two or more rows at a time in the pixel data included in the database image data $GD_{DB}$. For example, right after the pixel data d11, the pixel data d12, the pixel data d21, and the pixel data d22 are compared with the pixel data ddb11, the pixel data ddb12, the pixel data ddb21, and the pixel data ddb22, the pixel data d11, the pixel data d12, the pixel data d21, and the pixel data d22 may be compared with the pixel data ddb13, the pixel data ddb14, the pixel data ddb23, and the pixel data ddb24. In that case, the pixel data d11, the pixel data d12, the pixel data d21, and the pixel data d22 are not compared with the pixel data ddb12, the pixel data ddb13, the pixel data ddb22, and the pixel data ddb23. Right after the pixel data d11, the pixel data d12, the pixel data d21, and the pixel data d22 are compared with the pixel data ddb13, the pixel data ddb14, the pixel data ddb23, and the pixel data ddb24, the pixel data d11, the pixel data d12, the pixel data d21, and the pixel data d22 may be compared with the pixel data ddb31, the pixel data ddb32, the pixel data ddb41, and the pixel data ddb42.

An increase in the slide width of the compared data area 21 can reduce the number of arithmetic operations for the comparison between the pixel data included in the image data GD and the pixel data included in the database image data $GD_{DB}$. Accordingly, the degree of correspondence of the database image data $GD_{DB}$ to the image data GD can be calculated in a short time.

Figure 5A:
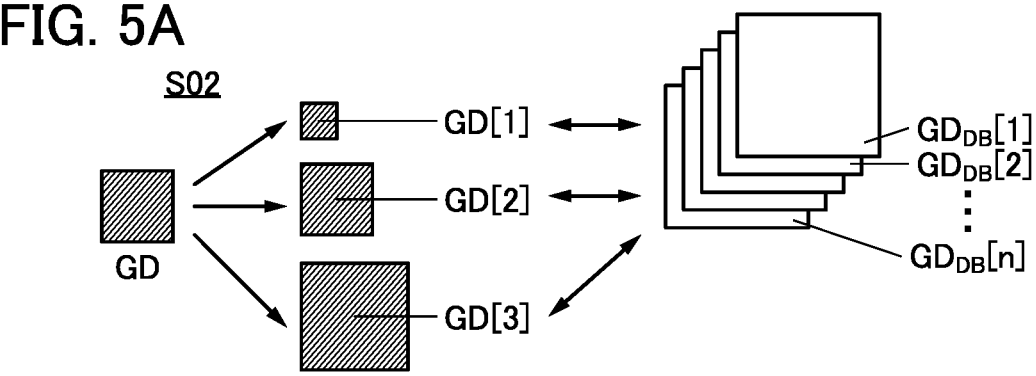
Figure 5A:
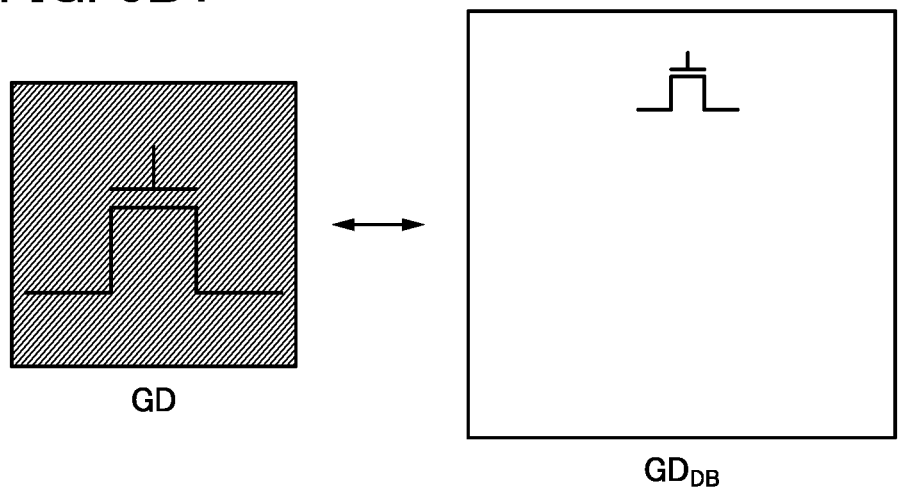
Figure 5A:
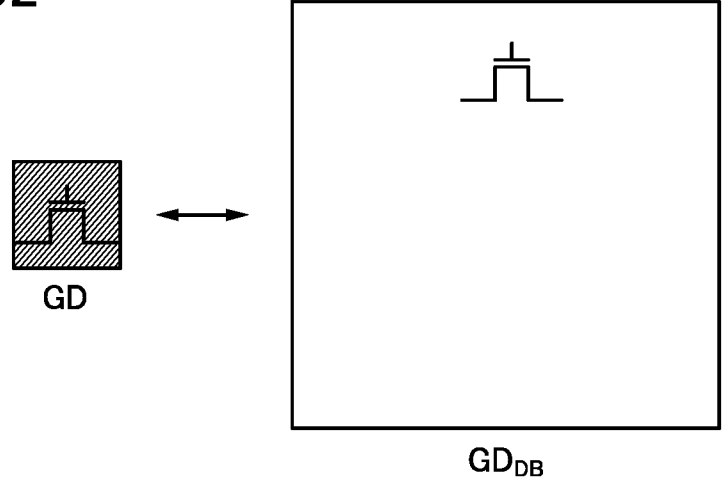

Although FIG. 3A shows the case where one piece of image data GD is compared with each of the n pieces of the database image data $GD_{DB}$, one embodiment of the present invention is not limited thereto. As illustrated in FIG. 5A, a plurality of pieces of the image data that differ in the number of pieces of the pixel data may be generated on the basis of the image data GD input to the processing portion 13. FIG. 5A shows the case where image data GD[1], image data GD[2], and image data GD[3], which differ in the number of pieces of the pixel data, are generated on the basis of the image data GD input to the processing portion 13. As illustrated in FIG. 5A, the number of pixels of an image corresponding to the image data GD[1], the number of pixels of an image corresponding to the image data GD[2], and the number of pixels of an image corresponding to the image data GD[3] are different from each other. In other words, the images corresponding to the image data GD[1] to the image data GD[3] can be regarded as enlarged or reduced images of the image corresponding to the image data GD input to the processing portion 13.

In the case where a plurality of pieces of the image data GD are generated, each of the plurality of pieces of the image data GD is compared with the database image data $GD_{DB}[1]$ to the database image data $GD_{DB}[n]$. Thus, the degrees of correspondence the database image data $GD_{DB}[1]$ to the database image data $GD_{DB}[n]$ to each of the plurality of pieces of the image data GD can be calculated. The highest correspondence degree of the above degrees of correspondence to the plurality of pieces of the image data GD can be regarded as the degree of correspondence of the database image data $GD_{DB}$ to the image data GD input to the processing portion 13, for example.

For example, in the case shown in FIG. 5A, the image data GD[1] is compared with each of the database image data $GD_{DB}[1]$ to the database image data $GD_{DB}[n]$, the image data GD[2] is compared with each of the database image data $GD_{DB}[1]$ to the database image data $GD_{DB}[n]$, and the image data GD[3] is compared with each of the database image data $GD_{DB}[1]$ to the database image data $GD_{DB}[n]$. Thus, the degree of correspondence to the image data GD[1], the degree of correspondence to the image data GD[2], and the degree of correspondence to the image data GD[3] can be calculated for each of the database image data $GD_{DB}[1]$ to the database image data $GD_{DB}[n]$.

For example, the highest correspondence degree of the degree of correspondence to the image data GD[1], the degree of correspondence to the image data GD[2], and the degree of correspondence to the image data GD[3] can be regarded as the degree of correspondence of the database image data $GD_{DB}$ to the image data GD input to the processing portion 13. For example, the highest correspondence degree of the degree of correspondence of the database image data $GD_{DB}$[1] to the image data GD[1], the degree of correspondence thereof to the image data GD[2], and the degree of correspondence thereof to the image data GD[3] can be regarded as the degree of correspondence of the database image data $GD_{DB}$[1] to the image data GD input to the processing portion 13.

Even in the case where the same component is illustrated in the image corresponding to the image data GD and the image corresponding to the database image data $GD_{DB}$, when the size of the component differs between the images, the database image data $GD_{DB}$ is possibly judged not to include an area with a high degree of correspondence to the image data GD. In the case shown in FIG. 5B1, the same component, which is a transistor symbol, is illustrated in both the image corresponding to the image data GD and the image corresponding to the database image data $GD_{DB}$. However, the size of the transistor symbol illustrated in the image corresponding to the image data GD and the size of the transistor symbol illustrated in the image corresponding to the database image data $GD_{DB}$ are different from each other. In this case, the degree of correspondence of the database image data $GD_{DB}$ to the image data GD is possibly judged to be low.

By contrast, in the case shown in FIG. 5B2, the same components, which are transistor symbols, are illustrated in both the image corresponding to the image data GD and the image corresponding to the database image data $GD_{DB}$ and the components also have the same size. Hence, the database image data $GD_{DB}$ can be judged to include an area with a high degree of correspondence to the image data GD by the processing portion 13.

As illustrated in FIG. 5A, when the plurality of pieces of the image data GD that differ in the number of pieces of the pixel data are generated, the size of the component illustrated in the image corresponding to the image data GD can be enlarged or reduced. Thus, even in the case where the same component is illustrated in the image corresponding to the image data GD input to the processing portion 13 and the image corresponding to the database image data $GD_{DB}$ in different sizes, the degree of correspondence between the both images can be high. For example, in the case where the image data GD illustrated in FIG. 5B1 is input to the processing portion 13, the image data GD illustrated in FIG. 5B2 is generated by a change in the number of pieces of the pixel data included in the image data GD so that the degree of correspondence of the database image data $GD_{DB}$ to the image data GD can be high. As described above, the degree of correspondence of the database image data $GD_{DB}$ to the image data GD input to the processing portion 13 can be calculated with high accuracy.

[Step S031]

Next, partial image data $GD_{part}$, which is data of an area with a high degree of correspondence to the image data GD, is extracted from the extracted image data $GD_{Ex}$ by the processing portion 13. For example, in the case where the degrees of correspondence of the areas of the database image data $GD_{DB}$ to the image data GD are each calculated by the method illustrated in FIG. 3B, the area with the highest correspondence degree is extracted as the partial image data $GD_{part}$. Thus, the number of pieces of the pixel data included in the partial image data $GD_{part}$ can be equal to the number of pieces of the pixel data included in the image data GD.

Figure 6A:
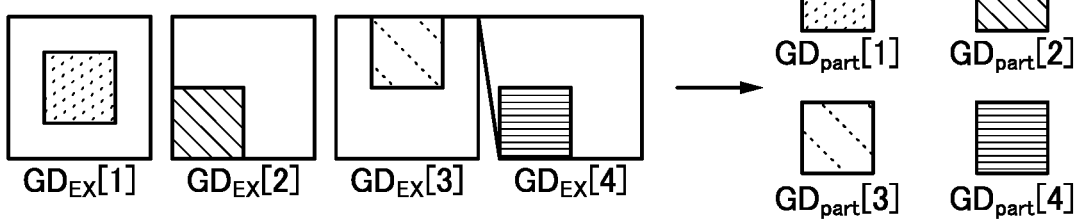
FIG. 6A and FIG. 6B are diagrams showing examples of an image retrieval method.
Figure 6B:
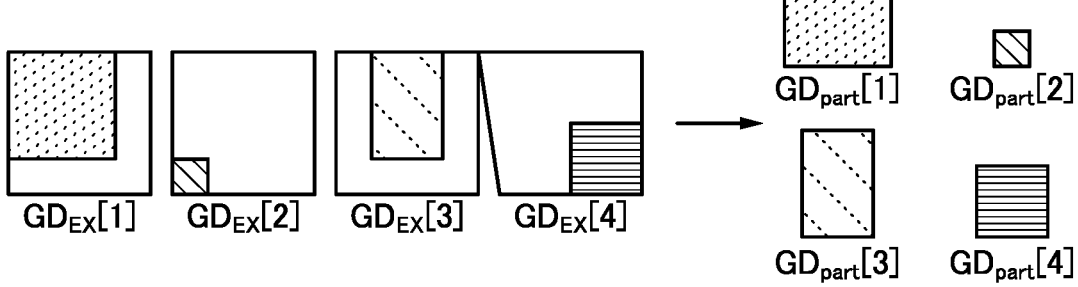

FIG. 6A and FIG. 6B are diagrams showing operation examples of Step S03. Areas with high degrees of correspondence to the image data GD in extracted image data $GD_{Ex}$[1] to extracted image data $GD_{Ex}$[4] are hatched as illustrated in FIG. 6A and FIG. 6B. As illustrated in FIG. 6A and FIG. 6B, the hatched areas can be extracted to be partial image data $GD_{part}$[1] to partial image data $GD_{part}$[4]. In FIG. 6A and FIG. 6B, image data extracted from the extracted image data $GD_{Ex}$[1] to the extracted image data $GD_{Ex}$[4] are referred to as the partial image data $GD_{part}r_r$[1] to the partial image data $GD_{part}$[4], respectively.

FIG. 6A shows the case where one piece of the image data GD is compared with the database image data $GD_{DB}$ as illustrated in FIG. 3A. In this case, the images corresponding to the partial image data $GD_{part}$ can all have the same number of pixels.

FIG. 6B shows the case where the plurality of pieces of the image data GD that differ in the number of pieces of the pixel data are compared with the database image data $GD_{DB}$ as illustrated in FIG. 5A. In this case, the number of pixels of the images corresponding to the partial image data $GD_{part}$ can be equal to the number of pixels of the image corresponding to the image data GD with the highest correspondence degree. Thus, in the case where there are a plurality of pieces of the partial image data $GD_{part}$, the numbers of pixels of the images corresponding to the partial image data $GD_{part}$ may differ depending on the partial image data $GD_{part}$. FIG. 6B shows the case where the numbers of pixels of the images corresponding to the partial image data $GD_{part}$[1] to the partial image data $GD_{part}$[4] are different from each other.

Note that the extraction of the partial image data $GD_{part}$ may be omitted. In this case, the following description can be applied when the partial image data $GD_{part}$ is read as the extracted image data $GD_{Ex}$ as appropriate; or the whole extracted image data $GD_{Ex}$ can be regarded as the partial image data $GD_{part}$. For example, when the number of pieces of the pixel data included in the image data GD is equal to the number of pieces of the pixel data included in the extracted image data $GD_{Ex}$, the image retrieval method of one embodiment of the present invention can be executed without the extraction of the partial image data $GD_{part}$. Even when the number of pieces of the pixel data included in the image data GD is different from the number of pieces of the pixel data included in the extracted image data $GD_{Ex}$, the image retrieval method of one embodiment of the present invention can be executed without the extraction of the partial image data $GD_{part}$. In this case, for example, the number of pieces of the pixel data included in one or both of the image data GD and the extracted image data $GD_{Ex}$ is increased or decreased, whereby the image retrieval method of one embodiment of the present invention can be executed.

[Step S041]

Next, the image data GD and the partial image data $GD_{part}$ are input to the neural network included in the processing portion 13.

Figure 7A:
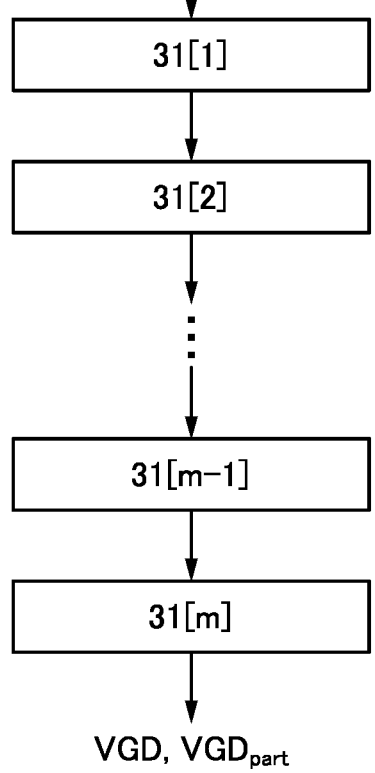
FIG. 7A and FIG. 7B are diagrams showing structure examples of neural networks.

FIG. 7A is a diagram showing a structure example of a neural network 30, which is the neural network included in the processing portion 13. The neural network 30 includes a layer 31[1] to a layer 31[m] (m is an integer greater than or equal to 1).

The layer 31[1] to the layer 31[m] include neurons and the neurons provided in the layers are connected to each other. For example, the neuron provided in the layer 31[1] is connected to the neuron provided in the layer 31[2]. The neuron provided in the layer 31[2] is connected to the neuron provided in the layer 31[1] and the neuron provided in the layer 31[3]. That is, the layer 31[1] to the layer 31[m] form a hierarchical neural network.

The image data GD and the partial image data $GD_{part}$ are input to the layer 31[1], and the layer 31[1] outputs data corresponding to the input image data. The data is input to the layer 31[2], and the layer 31[2] outputs data corresponding to the input data. Data output from the layer 31[m-1] is input to the layer 31[m], and the layer 31[m] outputs data corresponding to the input data. In this manner, the layer 31[1] can be the input layer, the layer 31[2] to the layer 31[m-1] can be the intermediate layers, and the layer 31[m] can be the output layer.

In Step S04, the processing portion 13 acquires the values of data output (output values) from the layer 31[1] to the layer 31[m] when the image data GD is input to the neural network 30. The processing portion 13 acquires the output values output from the layer 31[1] to the layer 31[m] when all pieces of the partial image data $GD_{part}$ are input to the neural network 30, for example. Here, the output values output from the layer 31[1] to the layer 31[m] represent, for example, the features of the image data input to the neural network 30.

The neural network 30 has learned in advance so that, for example, the output values output from the layer 31[1] to the layer 31[m] represent features of the image data input to the neural network 30. Learning can be performed by unsupervised leaning, supervised learning, or the like. Unsupervised learning does not require teacher data (also referred to as a correct label) and thus is particularly preferred. When learning is performed by either unsupervised leaning or supervised learning, a backpropagation method or the like can be used as a learning algorithm.

Here, the database image data $GD_{DB}$ is preferably used as learning data. This enables, for example, the output values output from the layer 31[1] to the layer 31[m] to accurately represent the features of the image data input to the neural network 30. For example, all the database image data $GD_{DB}$ stored in the database 17 is used as the learning data so that the neural network 30 can perform learning. For example, part of the database image data $GD_{DB}$ is used as the learning data so that the neural network 30 can perform learning. In addition to the database image data $GD_{DB}$, for example, the image data stored in the memory portion 15 and the image data input from the outside of the image retrieval system 10 to the processing portion 13 through the input portion 11 are used as the learning data so that the neural network 30 can perform learning.

Note that the use of the database image data $GD_{DB}$ as the learning data is not necessarily needed. For example, only the image data input from the outside of the image retrieval system 10 to the processing portion 13 through the input portion 11 is used as the learning data so that the neural network 30 can perform learning.

The number of pieces of the pixel data included in the image data used as the learning data is preferably equal to the number of pieces of the pixel data included in the image data input to the neural network 30. Thus, the number of pieces of the pixel data of the database image data $GD_{DB}$ or the like used as the learning data is preferably adjusted by being increased or decreased as needed when the neural network 30 performs learning. The number of pieces of the pixel data of the image data GD or the partial image data $GD_{part}$ is preferably adjusted by being increased or decreased as needed when the image data GD or the partial image data $GD_{part}$ is input to the neural network 30. Here, increasing the number of pieces of the pixel data is preferably performed by padding, for example, and is preferably performed by zero padding, for example.

Figure 8A:
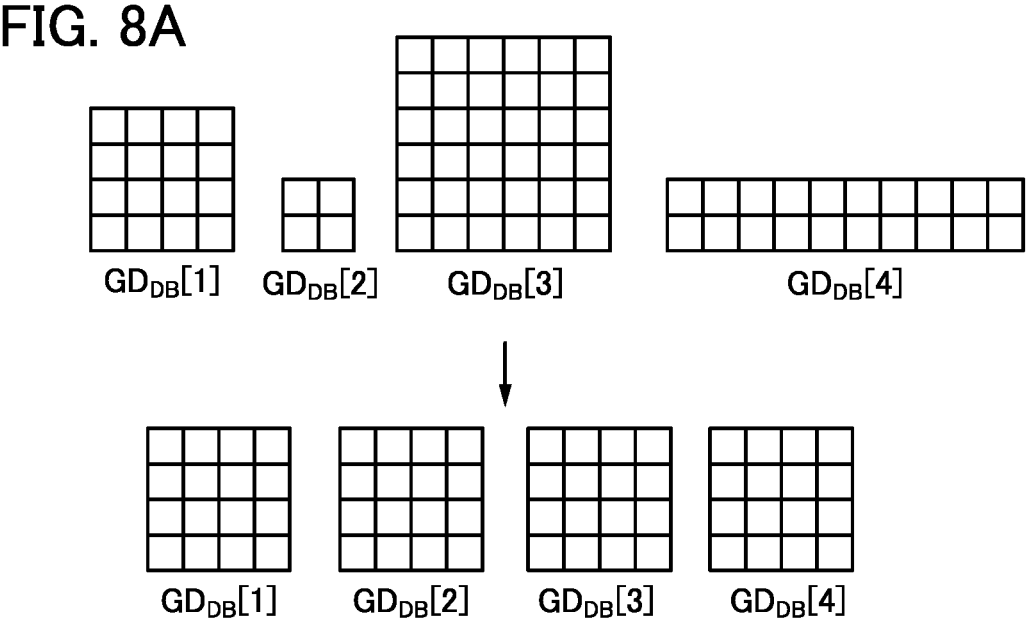
FIG. 8A and FIG. 8B are diagrams showing examples of an image retrieval method.

FIG. 8A is a diagram showing the adjustment of the number of pieces of the pixel data included in the database image data $GD_{DB}$. In the case shown in FIG. 8A, the numbers of pieces of the pixel data included in the database image data $GD_{DB}[1]$ to the database image data $GD_{DB}[4]$ are all different from each other. In this case, when the database image data $GD_{DB}[1]$ to the database image data $GD_{DB}[4]$ are used as the learning data of the neural network 30, the numbers of pieces of the pixel data included in the database image data $GD_{DB}[1]$ to the database image data $GD_{DB}[4]$ are preferably equalized as illustrated in FIG. 8A.

Figure 8B:
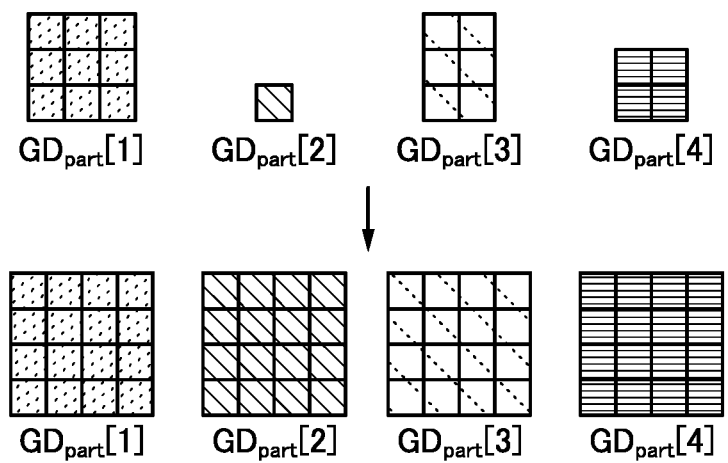

FIG. 8B is a diagram showing the adjustment of the number of pieces of the pixel data included in the partial image data $GD_{part}$. The partial image data $GD_{part}$ is part of the pixel data included in the database image data $GD_{DB}$ stored in the database 17 or the like. In the case shown in FIG. 8B, the numbers of pieces of the pixel data included in the partial image data $GD_{part}[1]$ to the partial image data $GD_{part}[4]$ are all different from each other. Even in such a case, the number of pieces of the pixel data included in the partial image data $GD_{part}$ is preferably equalized to the number of pieces of the pixel data included in the image data used for the learning in the neural network 30 by padding or the like. Similarly, the number of pieces of the pixel data included in the image data GD is preferably equalized to the number of pieces of the pixel data included in the image data used for the learning in the neural network 30 when the image data GD is input to the neural network 30.

Figure 7B:
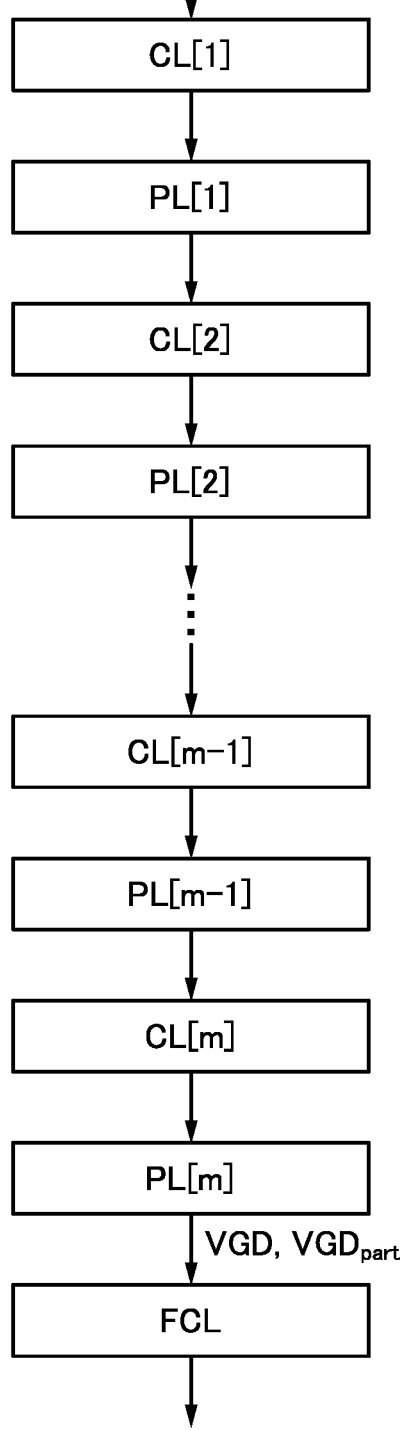

The neural network 30 can be a convolutional neural network (CNN). FIG. 7B is a diagram showing a structure example of the neural network 30 in the case where a CNN is used as the neural network 30. Here, the neural network 30 using a CNN is referred to as a neural network 30a.

The neural network 30a includes a convolutional layer CL, a pooling layer PL, and a fully connected layer FCL. FIG. 7B shows the case where the neural network 30a includes m convolutional layers CL, m pooling layers PL (m is an integer greater than or equal to 1), and one fully connected layer FCL. Note that the neural network 30a may include two or more fully connected layers FCL.

The convolutional layer CL has a function of performing convolution on data input to the convolutional layer CL. A convolutional layer CL[1] has a function of performing convolution on image data, for example. A convolutional layer CL[2] has a function of performing convolution on data output from a pooling layer PL[1]. A convolutional layer CL[m] has a function of performing convolution on data output from a pooling layer PL[m−1].

Convolution is performed by repetition of product-sum operation of the data input to the convolutional layer CL and the filter value of a weight filter. By the convolution in the convolutional layer CL, a feature or the like of an image corresponding to the image data input to the neural network 30a is extracted.

The data subjected to the convolution is converted using an activation function, and then output to a pooling layer PL. As the activation function, ReLU (Rectified Linear Units) or the like can be used. ReLU is a function that outputs "0" when an input value is negative and outputs the input value as it is when the input value is greater than or equal to "0". As the activation function, a sigmoid function, a tanh function, or the like may be used as well.

The pooling layer PL has a function of performing pooling on the data input from the convolution layer CL. Pooling is processing in which the data is partitioned into a plurality of regions, and predetermined data is extracted from each of the regions and arranged in a matrix. By the pooling, the size of the data can be reduced while the features extracted by the convolution layer CL remains. Robustness for a minute difference of the input data can be increased. Note that as the pooling, max pooling, average pooling, Lp pooling, or the like can be used.

A fully connected layer FCL has a function of determining an image using the image data subjected to convolution and pooling. The fully connected layer FCL has a structure in which all the nodes in one layer are connected to all the nodes in the next layer. The data output from the convolution layer CL or the pooling layer PL is a two-dimensional feature map and is unfolded into a one-dimensional feature map when input to the fully connected layer FCL. Then, data obtained as a result of the inference by the fully connected layer FCL is output from the fully connected layer FCL.

Note that the structure of the neural network $30a$ is not limited to the structure in FIG. 7B. For example, the pooling layer PL may be provided for each plurality of convolutional layers CL. In other words, the number of the pooling layers PL included in the neural network $30a$ may be less than the number of the convolutional layers CL. In the case where the positional information of the extracted feature is desired to be left as much as possible, the pooling layer PL may be omitted.

Owing to the learning in the neural network $30a$, the filter value of the weight filter, the weight coefficient of the fully connected layer FCL, or the like can be optimized.

Figure 9:
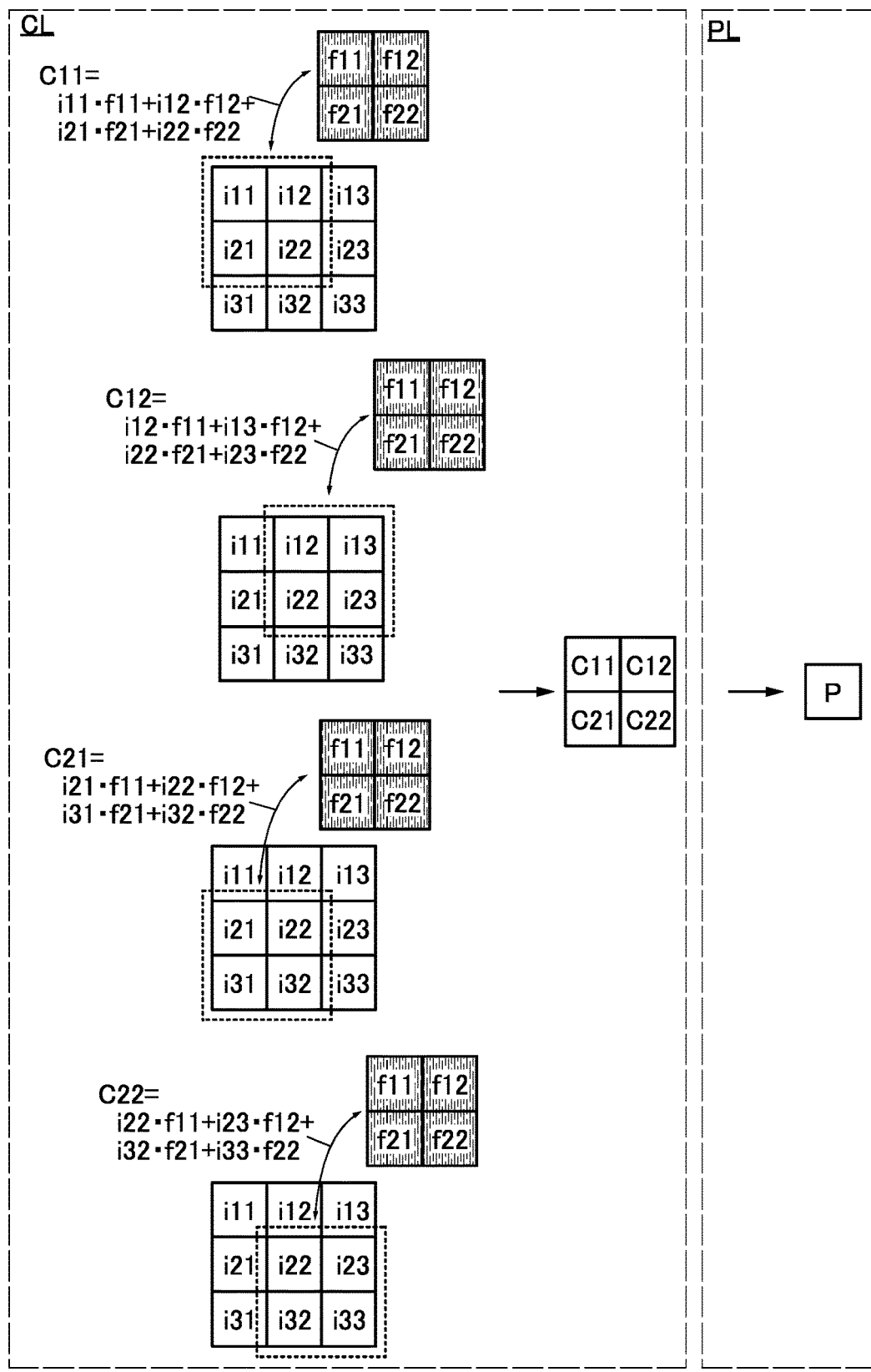
FIG. 9 is a diagram showing an example of an image retrieval method.

Next, an example of convolution processing performed in the convolutional layer CL and pooling processing performed in the pooling layer PL is described with reference to FIG. 9. In FIG. 9, data input to the convolutional layer CL includes input data values in three rows and three columns (an input data value i11, an input data value i12, an input data value i13, an input data value i21, an input data value i22, an input data value i23, an input data value i31, an input data value i32, and an input data value i33). The weight filter includes filter values in two rows and two columns (a filter value f11, a filter value f12, a filter value f21, and a filter value f22). Here, for example, the above input data value input to the convolutional layer CL[1] can be a gray level represented by pixel data. For example, the above input data value input to the convolutional layer CL[2] can be an output value of the pooling layer PC[1] and the above input data value input to the convolutional layer CL[m] can be an output value of a pooling layer PC[m−1].

The convolution is performed by product-sum operation of the input data value and the filter value. The filter value can be data representing a prescribed feature (referred to as feature data). In this case, by comparison between the input data value and the filter value, feature extraction can be performed for the image data input to the neural network $30a$.

FIG. 9 shows a state where the convolutional layer CL performs filter processing on the input data value i11, the input data value i12, the input data value i21, and the input data value i22 to acquire a convolution value C11, which is an output value output from the convolutional layer CL. FIG. 9 also shows a state where the convolutional layer CL performs filter processing on the input data value i12, the input data value i13, the input data value i22, and the input data value i23 to acquire a convolution value C12, which is an output value output from the convolutional layer CL. FIG. 9 also shows a state where the convolutional layer CL performs filter processing on the input data value i21, the input data value i22, the input data value i31, and the input data value i32 to acquire a convolution value C21, which is an output value output from the convolutional layer CL. FIG. 9 further shows a state where the convolutional layer CL performs filter processing on the input data value i22, the input data value i23, the input data value i32, and the input data value i33 to acquire a convolution value C22, which is an output value output from the convolutional layer CL. The above indicates that a stride of the convolution processing illustrated in FIG. 9 is one.

The convolution value C11, the convolution value C12, the convolution value C21, and the convolution value C22 can be acquired by the product-sum operation shown below.

[Formula 1]

$$C11=i11 \cdot f11+i12 \cdot f12+i21 \cdot f21+i22 \cdot f22 \qquad (1)$$

[Formula 2]

$$C12=i12 \cdot f11+i13 \cdot f12+i22 \cdot f21+i23 \cdot f22 \qquad (2)$$

[Formula 3]

$$C21=i21 \cdot f11+i22 \cdot f12+i31 \cdot f21+i32 \cdot f22 \qquad (3)$$

[Formula 4]

$$C22=i22 \cdot f11+i23 \cdot f12+i32 \cdot f21+i33 \cdot f22 \qquad (4)$$

The convolution value C11, the convolution value C12, the convolution value C21, and the convolution value C22 acquired by the convolutional layer CL are arranged in a matrix according to an address and then output to the pooling layer PL. Specifically, the convolution value C11 is placed in a first row and a first column, the convolution value C12 is placed in the first row and a second column, the convolution value C21 is placed in a second row and the first column, and the convolution value C22 is placed in the second row and the second column.

FIG. 9 shows a state where the convolution value C11, the convolution value C12, the convolution value C21, and the convolution value C22 are input to the pooling layer PL and one value is set to a pooling value P on the basis of the four convolution values. For example, the maximum value of the convolution value C11, the convolution value C12, the convolution value C21, and the convolution value C22 can be set to the pooling value P, or the average value of the convolution value C11, the convolution value C12, the convolution value C21, and the convolution value C22 can be set to the pooling value P. The pooling value P is an output value output from the pooling layer PL.

Although FIG. 9 shows the case where the data input to the convolutional layer CL is processed by one weight filter, the processing may be performed by two or more weight filters. In this case, a plurality of features included in the image data input to the neural network $30a$ can be extracted. In the case where the data input to the convolutional layer CL is processed by two or more weight filters, the processing illustrated in FIG. 9 is performed for each filter. Although the stride is one in FIG. 9 as described above, the stride may be two or more.

Figure 10:
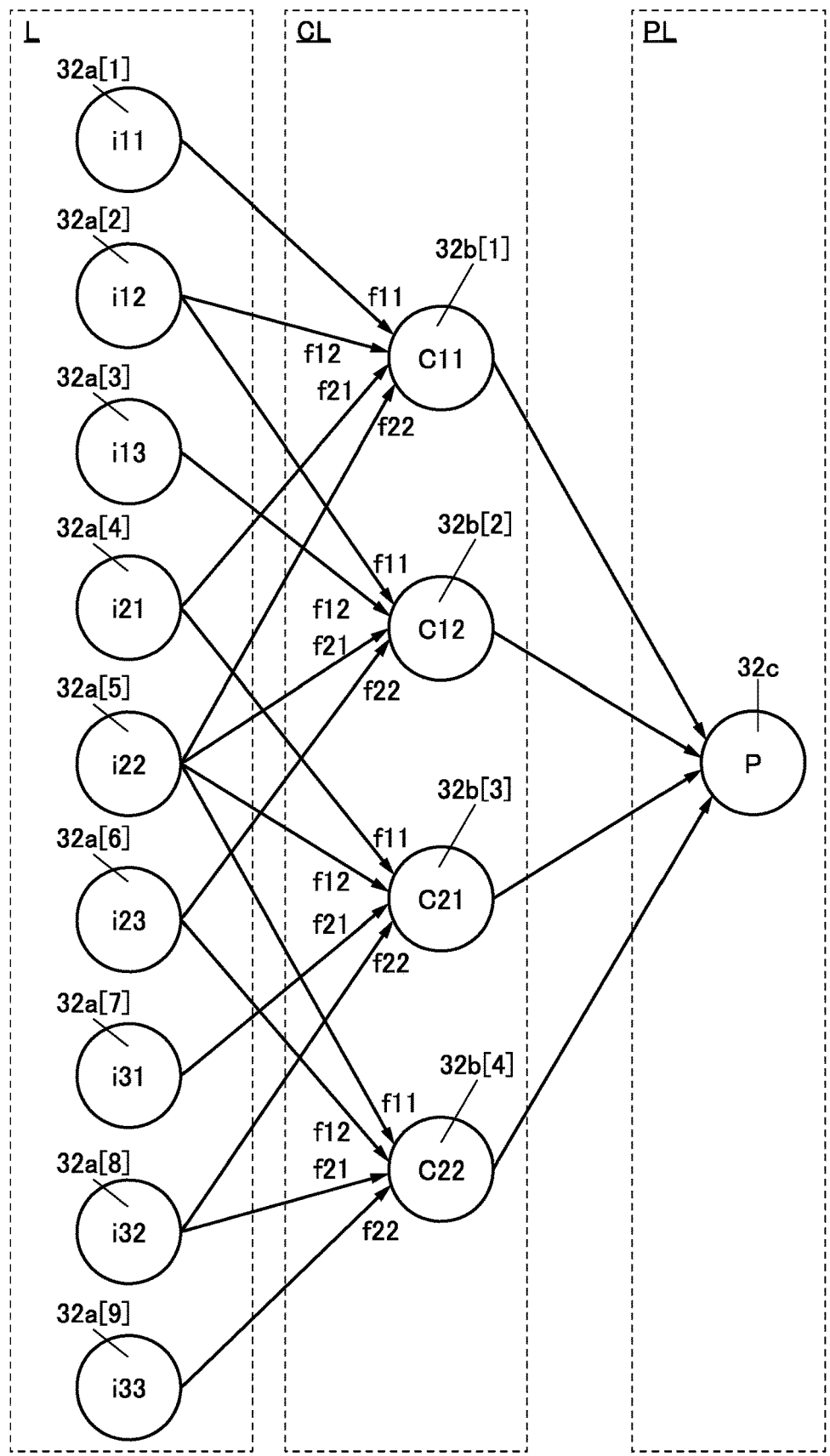
FIG. 10 is a diagram showing a structure example of a neural network.

FIG. 10 is a diagram showing a structure example of the convolutional layer CL and the pooling layer PL included in the neural network $30a$. FIG. 10 shows the case where the convolutional layer CL and the pooling layer PL perform the operation illustrated in FIG. 9.

FIG. 10 illustrates neurons 32. Specifically, a neuron 32a, a neuron 32b, and a neuron 32c are illustrated as the neurons 32. In FIG. 10, an output value output from the neuron 32 is shown inside the neuron 32. The output value is output in the direction of an arrow. In the case where the output value is multiplied by a weight coefficient, the weight coefficient is described near the arrow. In FIG. 10, the filter value f11, the filter value f12, the filter value f21, and the filter value f22 are weight coefficients.

The neuron 32a is the neuron 32 included in a layer L which is a layer prior to the convolutional layer CL illustrated in FIG. 10. For example, the layer L can be an input layer when the convolutional layer CL is the convolutional layer CL[1], the layer L can be the pooling layer PL[1] when the convolutional layer CL is the convolutional layer CL[2], and the layer L can be the pooling layer PL[m−1] when the convolutional layer CL is the convolutional layer CL[m].

FIG. 10 illustrates a neuron 32a[1] to a neuron 32a[9] as the neurons 32a. In the case shown in FIG. 10, the neuron 32a[1] outputs the input data value i11, the neuron 32a[2] outputs the input data value i12, the neuron 32a[3] outputs the input data value i13, the neuron 32a[4] outputs the input data value i21, the neuron 32a[5] outputs the input data value i22, the neuron 32a[6] outputs the input data value i23, the neuron 32a[7] outputs the input data value i31, the neuron 32a[8] outputs the input data value i32, and the neuron 32a[9] outputs the input data value i33.

The neuron 32b is the neuron 32 included in the convolutional layer CL illustrated in FIG. 10. FIG. 10 illustrates a neuron 32b[1] to a neuron 32b[4] as the neurons 32b.

In the case shown in FIG. 10, a value obtained by multiplying the input data value i11 by the filter value f11, a value obtained by multiplying the input data value i12 by the filter value f12, a value obtained by multiplying the input data value i21 by the filter value f21, and a value obtained by multiplying the input data value i22 by the filter value f22 are input to the neuron 32b[1]. Then, the convolution value C11 which is the sum of these values is output from the neuron 32b[1].

A value obtained by multiplying the input data value i12 by the filter value f11, a value obtained by multiplying the input data value i13 by the filter value f12, a value obtained by multiplying the input data value i22 by the filter value f21, and a value obtained by multiplying the input data value i23 by the filter value f22 are input to the neuron 32b[2]. Then, the convolution value C12 which is the sum of these values is output from the neuron 32b[2].

A value obtained by multiplying the input data value i21 by the filter value f11, a value obtained by multiplying the input data value i22 by the filter value f12, a value obtained by multiplying the input data value i31 by the filter value f21, and a value obtained by multiplying the input data value i32 by the filter value f22 are input to the neuron 32b[3]. Then, the convolution value C21 which is the sum of these values is output from the neuron 32b[3].

A value obtained by multiplying the input data value i22 by the filter value f11, a value obtained by multiplying the input data value i23 by the filter value f12, a value obtained by multiplying the input data value i32 by the filter value f21, and a value obtained by multiplying the input data value i33 by the filter value f22 are input to the neuron 32b[4]. Then, the convolution value C22 which is the sum of these values is output from the neuron 32b[4].

As illustrated in FIG. 10, each of the neuron 32b[1] to the neuron 32b[4] is connected to some of the neuron 32a[1] to the neuron 32a[9]. Thus, it can be said that the convolutional layer CL is a partial connection layer.

The neuron 32c is the neuron 32 included in the pooling layer PL illustrated in FIG. 10. In the case shown in FIG. 10, the convolution value C11, the convolution value C12, the convolution value C21, and the convolution value C22 are input to the neuron 32c. Then, the pooling value P is output from the neuron 32c. Note that the convolution value output from the neuron 32b is not multiplied by a weight coefficient. A weight coefficient is a parameter optimized by the learning in the neural network, as described above. Hence, the structure in which the parameter optimized by the learning is not used as a parameter used in the arithmetic operation by the pooling layer PL can be employed.

[Step S05]

Next, the output value, which is output from the layer included in the neural network when the image data GD is input to the neural network included in the processing portion 13, is compared with the output value, which is output from the layer included in the neural network when the partial image data $GD_{part}$ is input. This allows the calculation of the similarity of the partial image data $GD_{part}$ to the image data GD, as a numerical value.

In the case where the processing portion 13 includes the neural network 30 having the structure illustrated in FIG. 7A, for example, the output values output from any of the layer 31[1] to the layer 31[m] are compared. For example, the output values output from the layer 31[m] are compared. Note that only the output values of one layer of the layer 31[1] to the layer 31[m] may be compared or the output values of the two or more layers may be compared. Comparing the output values of many layers 31 enables high accuracy calculation of the similarity of the partial image data $GD_{part}$ to the image data GD.

In this specification and the like, an output value VGD is the output value that is compared as described above, among the output values output from the layer included in the neural network when the image data GD is input to the neural network included in the processing portion 13. An output value $VGD_{part}$ is the output value that is compared as described above, among the output values output from the layer included in the neural network when the partial image data $GD_{part}$ is input to the neural network included in the processing portion 13. That is, in Step S05, the output value VGD and the output value $VGD_{part}$ are compared.

In FIG. 7A, the output value VGD and the output value $VGD_{part}$ are the output values from the layer 31[m].

In the case where the processing portion 13 includes the neural network 30a having the structure illustrated in FIG. 7B, for example, output values output from any of the pooling layer PL[1] to the pooling layer PL[m] are compared. For example, the output values from the pooling layer PL[m] are compared. Note that the output values output from any of the convolutional layer PL[1] to the convolutional layer PL[m] may be compared or the output values output from the fully connected layer FCL may be compared.

The output values of only one layer or the output values of two or more layers of the convolutional layer CL[1] to the convolutional layer CL[m], the pooling layer PL[1] to the pooling layer PL[m], and the fully connected layer FCL may be compared. Comparing the output values of many layers enables high accuracy calculation of the similarity of the partial image data $GD_{part}$ to the image data GD.

In FIG. 7B, the output value VGD and the output value $VGD_{part}$ are the output values from the pooling layer PL[m].

Figure 11:
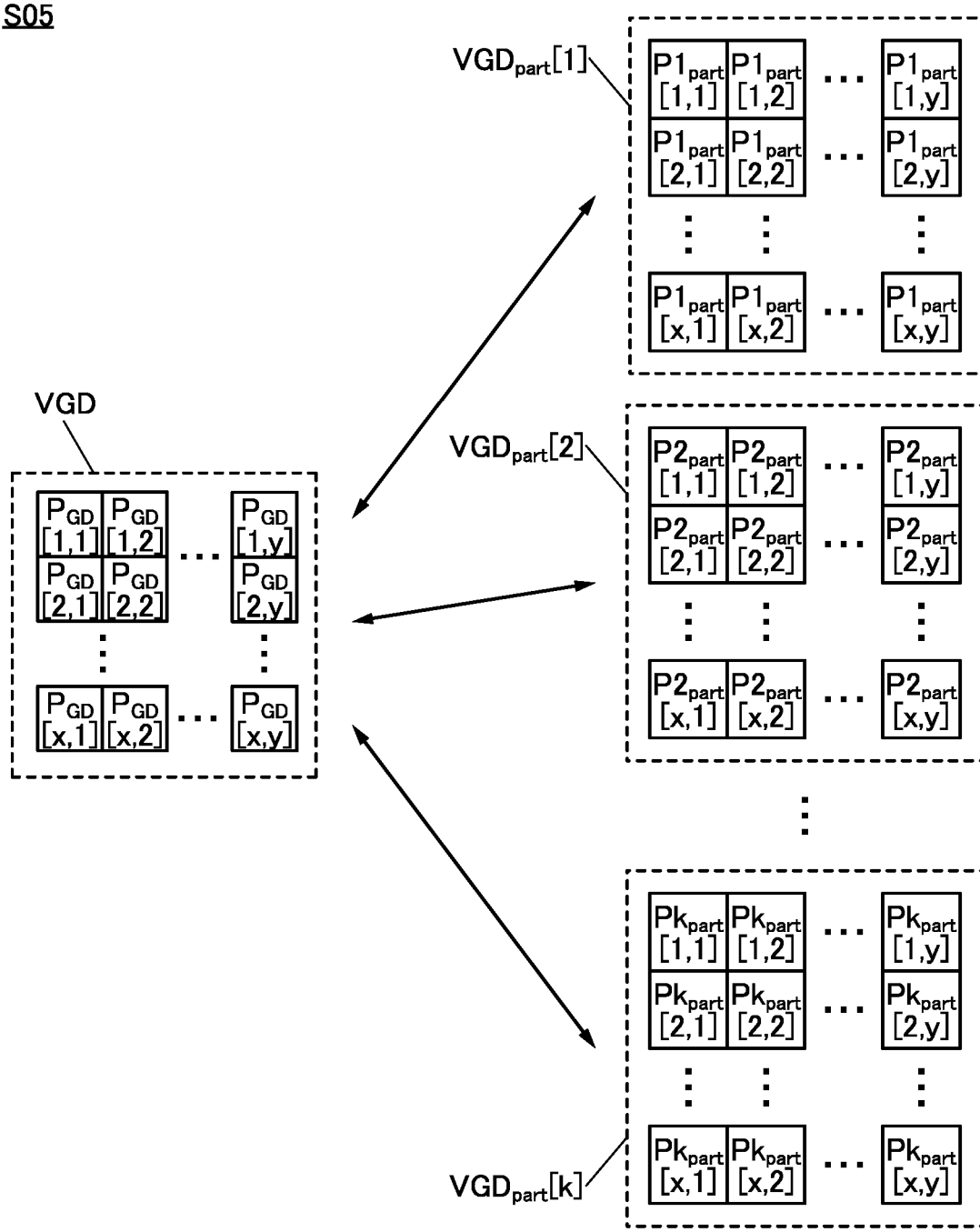
FIG. 11 is a diagram showing an example of an image retrieval method.

FIG. 11 shows the case where the output values from the pooling layer PL which outputs the pooling value P in an x-th row and a y-th column (x and y are integers greater than or equal to 1) are the output value VGD and the output value $VGD_{part}$. In the case shown in FIG. 11, the image data GD and k pieces (k is an integer greater than or equal to 1) of the partial image data $GD_{part}$ are input to the neural network 30a.

In this specification and the like, for example, the output values $VGD_{part}$ corresponding to the k pieces of the partial image data $GD_{part}$ are distinguished by being referred to as an output value $VGD_{part}[1]$ to an output value $VGD_{part}[k]$.

In FIG. 11 and the like, the output value VGD includes a pooling value $P_{GD}[1,1]$ to a pooling value $P_{GD}[x,y]$. For example, the output value $VGD_{part}[1]$ includes a pooling value $P1_{part}[1,1]$ to a pooling value $P1_{part}[x,y]$, the output value $VGD_{part}[2]$ includes a pooling value $P2_{part}[1,1]$ to a pooling value $P2_{part}[x,y]$, and the output value $VGD_{part}[k]$ includes a pooling value $Pk_{part}[1,1]$ to a pooling value $Pk_{part}[x,y]$.

In the case shown in FIG. 11, the output value VGD is compared with each of the output value $VGD_{part}[1]$ to the output value $VGD_{part}[k]$. Thus, the similarity to the image data GD is calculated for each of the k pieces of the partial image data $GD_{part}$. For example, cosine similarity is calculated, or Euclidian similarity, Minkowski similarity, or the like may be calculated. As described above, the database image partly including an image similar to the image corresponding to the image data GD can be retrieved.

In the image retrieval system 10, the above similarity can be calculated with high accuracy in a short time by comparison between the output values of the layer included in the neural network provided in the processing portion 13 as described above. Accordingly, the database image partly including an image similar to the image corresponding to the image data GD can be retrieved with high accuracy as compared with the case where the image data GD and the database image data $GD_{DB}$ are compared only by area-based matching, for example. The database image partly including an image similar to the image corresponding to the image data GD can be retrieved in a short time as compared with the case where the image data GD and the database image data $GD_{DB}$ are compared only by feature-based matching, for example. Furthermore, since the above similarity can be calculated as a numerical value, the degrees of correspondence of the database images to the image corresponding to the image data GD can be ranked, for example.

In the image retrieval system 10, the image data GD is compared with the database image data $GD_{DB}$ by area-based matching or the like, and the database image data $GD_{DB}$ including an area with a high degree of correspondence to the image data GD is extracted as the extracted image data $GD_{Ex}$. After that, the partial image data $GD_{part}$ is extracted from the extracted image data $GD_{Ex}$, and the image data GD and the partial image data $GD_{part}$ are input to the neural network included in the processing portion 13. By the extraction of the database image data $GD_{DB}$ in this manner, it is possible to inhibit input of the database image data $GD_{DB}$, which represents the database image that does not include an image with a high degree of correspondence to the image corresponding to the image data GD, to the neural network included in the processing portion 13. Thus, the database image partly including an image similar to the image corresponding to the image data GD can be retrieved with high accuracy in a short time. Note that, for example, in the case where the number of pieces of the database image data $GD_{DB}$ compared with the image data GD is small, the above retrieval can be performed with high accuracy in a short time even without the extraction of the database image data $GD_{DB}$.

<3. Image Retrieval Method 2>

In the above, although the number of pieces of the pixel data included in the image data GD input to the processing portion 13 is less than or equal to the number of pieces of the pixel data included in the database image data $GD_{DB}$ in the description of the image retrieval method of one embodiment of the present invention, one embodiment of the present invention is not limited thereto. The number of pieces of the pixel data included in the image data GD input to the processing portion 13 may be greater than the number of pieces of the pixel data included in the database image data $GD_{DB}$. In this case, the image retrieval system 10 can retrieve a database image similar to part of the query image, for example.

Figure 12:
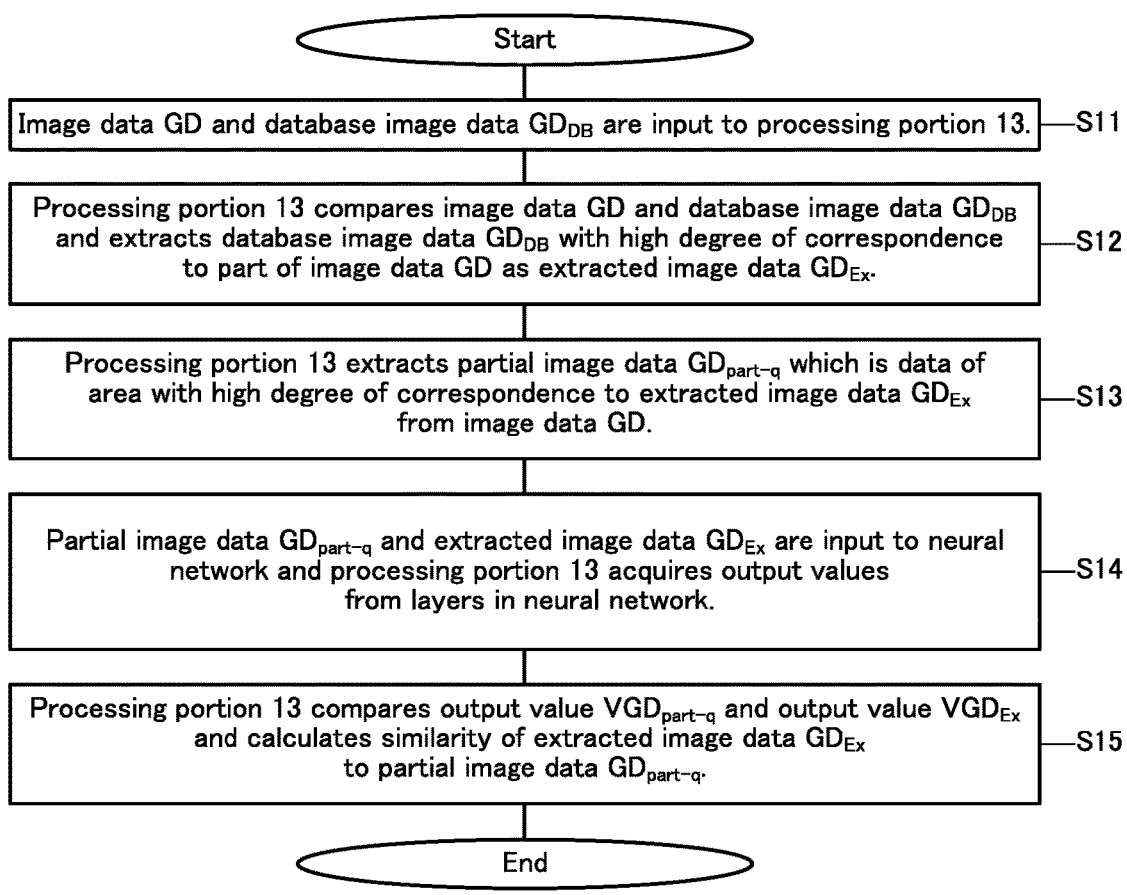
FIG. 12 is a flow chart showing an example of an image retrieval method.

FIG. 12 is a flow chart showing an example of an image retrieval method using the image retrieval system 10 in the case where the number of pieces of the pixel data included in the image data GD is greater than the number of pieces of the pixel data included in the database image data $GD_{DB}$.

[Step S11]

First, as in Step S01 shown in FIG. 2, the image data GD and the database image data $GD_{DB}$ are input to the processing portion 13.

[Step S12]

Next, the processing portion 13 compares the image data GD with the database image data $GD_{DB}$ to extract the database image data $GD_{DB}$ including an area with a high degree of correspondence to part of the image data GD as the extracted image data $GD_{Ex}$. As in Step S02, the comparison between the image data GD and the database image data $GD_{DB}$ can be performed by area-based matching, for example.

Figure 13A:
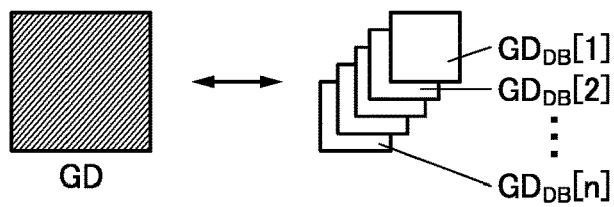
FIG. 13A and FIG. 13B are diagrams showing an example of an image retrieval method.

An operation example of Step S12 is described in detail with reference to FIG. 13 and FIG. 14. In Step S12, the image data GD is compared with each of n pieces of the database image data $GD_{DB}$, as illustrated in FIG. 13A.

Figure 13B:
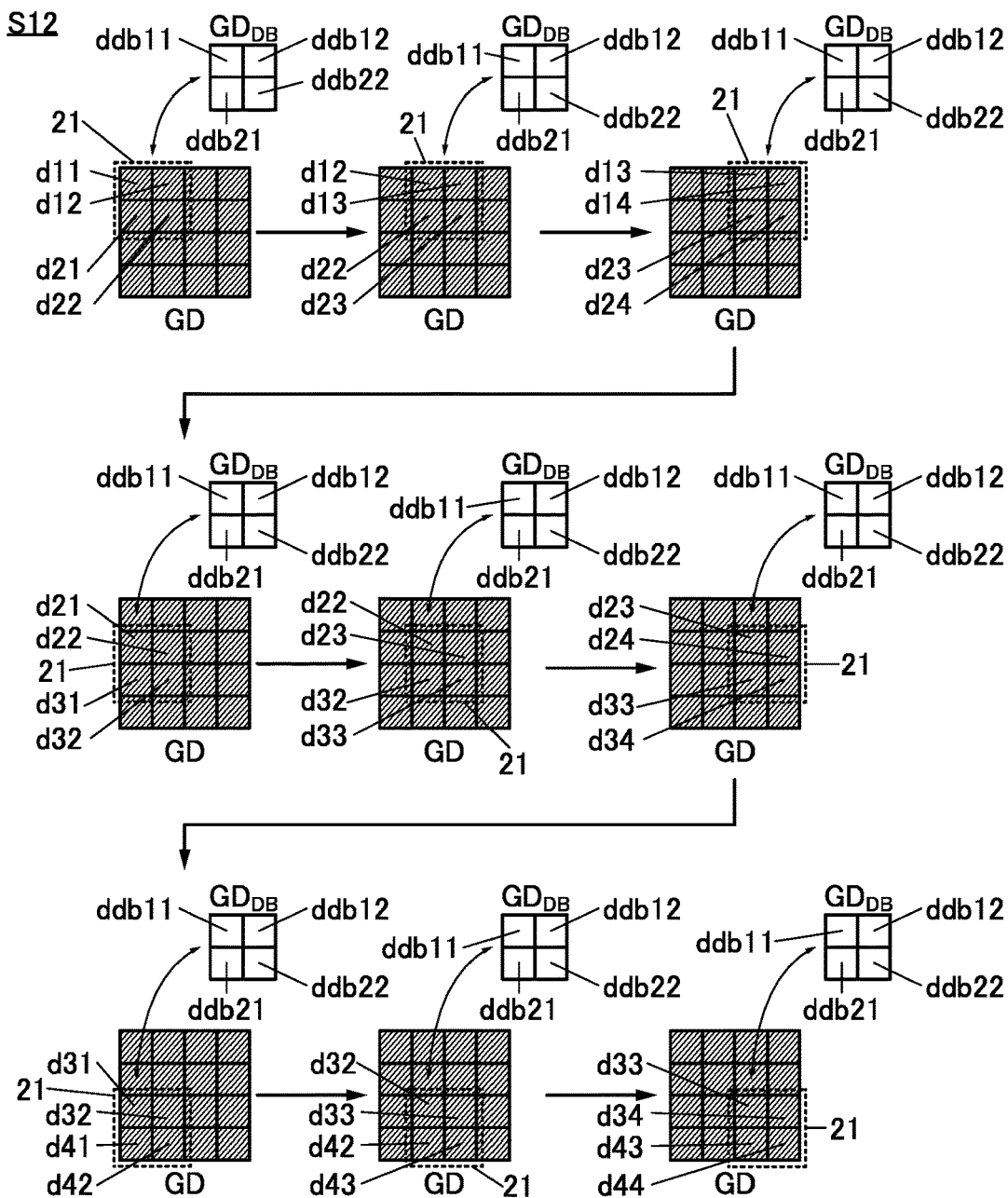

FIG. 13B is a diagram illustrating a procedure in which the image data GD and the database image data $GD_{DB}$ are compared by area-based matching. Here, the number of pixels of the image corresponding to the image data GD is 4×4 and the number of pixels of an image corresponding to the database image data $GD_{DB}$ is 2×2. In other words, the image data GD includes 4×4 pieces of pixel data and the database image data $GD_{DB}$ includes 2×2 pieces of pixel data.

In FIG. 13B, the 4×4 pieces of pixel data included in the image data GD is referred to as the pixel data d11 to the pixel data d44. In the image data GD, the pixel data d11 is pixel data corresponding to a pixel in a first row and a first column, the pixel data d14 is pixel data corresponding to a pixel in the first row and a fourth column, the pixel data d41 is pixel data corresponding to a pixel in a fourth row and the first column, and the pixel data d44 is pixel data corresponding to a pixel in the fourth row and the fourth column, for example. The 2×2 pieces of pixel data included in the database image data $GD_{DB}$ is referred to as the pixel data ddb11, the pixel data ddb12, the pixel data ddb21, and the pixel data ddb22. In the database image data $GD_{DB}$, the pixel data ddb11 is pixel data corresponding to a pixel in a first row and a first column, the pixel data ddb12 is pixel data corresponding to a pixel in the first row and a second column, the pixel data ddb21 is pixel data corresponding to a pixel in a second row and the first column, and the pixel data ddb22 is pixel data corresponding to a pixel in the second row and the second column, for example.

First, the pixel data ddb11, the pixel data ddb12, the pixel data ddb21, and the pixel data ddb22 are compared with the pixel data d11, the pixel data d12, the pixel data d21, and the pixel data d22. Consequently, the degree of correspondence between the database image data $GD_{DB}$ and an area formed of the pixel data d11, the pixel data d12, the pixel data d21, and the pixel data d22 in the image data GD can be calculated. Note that in FIG. 13B, pixel data compared with the database image data $GD_{DB}$, which are among the pixel data included in the image data GD, are referred to as the compared data area 21 surrounded by a dashed line.

Next, the compared data area 21 slides one column at a time in the pixel data included in the image data GD, and comparison between the pixel data is performed as described above to calculate correspondence degree. Specifically, the pixel data ddb11, the pixel data ddb12, the pixel data ddb21, and the pixel data ddb22 are compared with the pixel data d12, the pixel data d13, the pixel data d22, and the pixel data d23. Consequently, the degree of correspondence between the database image data $GD_{DB}$ and an area formed of the pixel data d12, the pixel data d13, the pixel data d22, and the pixel data d23 in the image data GD can be calculated.

After that, the compared data area 21 slides one column at a time in the pixel data included in the image data GD, and comparison between the pixel data is performed as described above to calculate correspondence degree. Specifically, the pixel data ddb11, the pixel data ddb12, the pixel data ddb21, and the pixel data ddb22 are compared with the pixel data d13, the pixel data d14, the pixel data d23, and the pixel data d24. Consequently, the degree of correspondence between the database image data $GD_{DB}$ and an area formed of the pixel data d13, the pixel data d14, the pixel data d23, and the pixel data d24 in the image data GD can be calculated.

Next, the compared data area 21 slides one row at a time in the pixel data included in the image data GD, and pixel data in the second row and pixel data in the third row in the pixel data included in the image data GD are compared with the database image data $GD_{DB}$ as described above for each column. Consequently, the degree of correspondence between th database image data $GD_{DB}$ and the pixel data in the second row and the third row included in the image data GD can be calculated as described above for each column.

After that, the compared data area 21 slides one row at a time in the pixel data included in the image data GD, and pixel data in the third row and pixel data in the fourth row in the pixel data included in the image data GD are compared with the database image data $GD_{DB}$ as described above for each column. Consequently, the degree of correspondence between the database image data $GD_{DB}$ and the pixel data in the third row and the fourth row included in the image data GD can be calculated as described above for each column.

After the above operation is performed, the highest correspondence degree is regarded as the degree of correspondence of the database image data $GD_{DB}$ to the image data GD, for example. The above is performed for each of then pieces of the database image data $GD_{DB}$. After that, as in Step S02, the database image data $GD_{DB}$ with a high degree of correspondence to the image data GD is extracted as the extracted image data $GD_{Ex}$ from the n pieces of the database image data $GD_{DB}$. Note that as in Step S02, the extraction of the database image data $GD_{DB}$ may be omitted.

Figure 14:
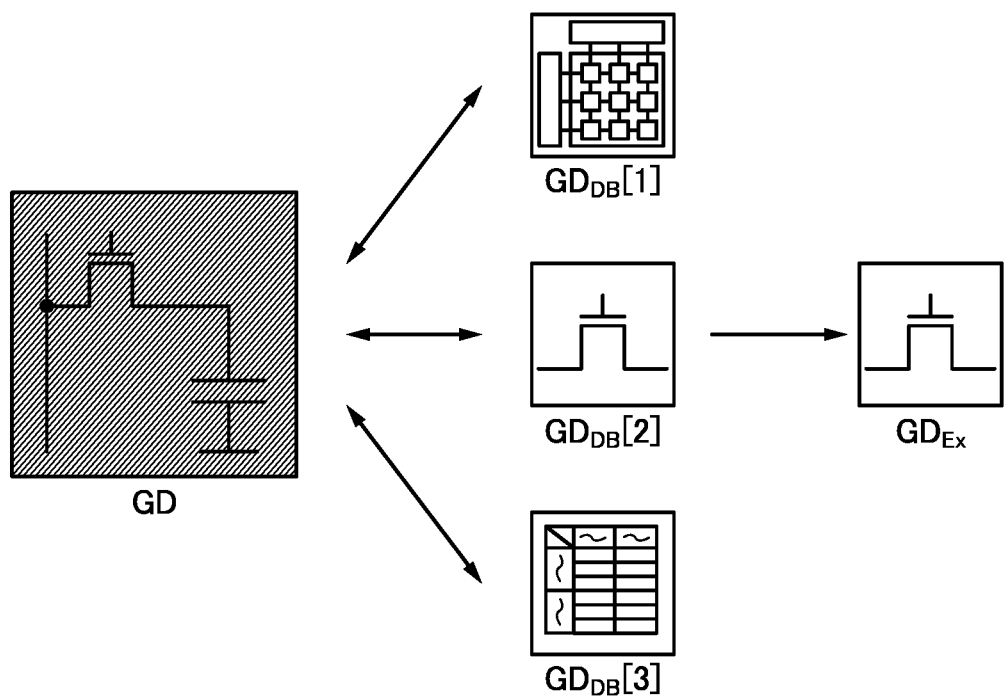
FIG. 14 is a diagram showing an example of an image retrieval method.

FIG. 14 is a drawing showing the extraction of the database image data $GD_{DB}$. FIG. 14 shows the case where one piece of image data is extracted as the extracted image data $GD_{Ex}$ from the database image data $GD_{DB}[1]$ to the database image data $GD_{DB}[3]$.

An image corresponding to the image data GD illustrated in FIG. 14 includes a transistor symbol and a capacitor symbol, for example. An image corresponding to the database image data $GD_{DB}[2]$ illustrated in FIG. 14 includes a transistor symbol, while an image corresponding to the database image data $GD_{DB}[1]$ and an image corresponding to the database image data $GD_{DB}[3]$ do not include a transistor symbol and a capacitor symbol. In this case, the degree of correspondence of the database image data $GD_{DB}[2]$ to the image data GD is higher than the degrees of correspondence of the database image data $GD_{DB}[1]$ and the database image data $GD_{DB}[3]$ to the image data GD. Thus, the database image data $GD_{DB}[2]$ can be extracted as the extracted image data $GD_{Ex}$.

Note that a method similar to the method that can be used in Step S02 can be used for the comparison between the image data GD and the database image data $GD_{DB}$ and the calculation of the correspondence degree. Although the compared data area slides one column or one row at a time for the pixel data included in the image data GD in FIG. 13B, the compared data area 21 may slide two or more columns or two or more rows at a time for the pixel data included in the image data GD, as in Step S02. As in the case shown in FIG. 5A, a plurality of pieces of the image data GD that differ in the number of pieces of the pixel data may be generated on the basis of the image data GD input to the processing portion 13.

[Step S13]

Next, partial image data $GD_{part-q}$, which is data of an area with a high degree of correspondence to the extracted image data $GD_{Ex}$, is extracted from the image data GD by the processing portion 13. For example, in the case where the degrees of correspondence of the areas of the image data GD to the database image data $GD_{DB}$ are each calculated by the method illustrated in FIG. 13B, the area with the highest correspondence degree is extracted as the partial image data $GD_{part-q}$. Thus, the number of pieces of the pixel data included in the partial image data $GD_{part-q}$ can be equal to the number of pieces of the pixel data included in the extracted image data $GD_{Ex}$.

Figure 15:
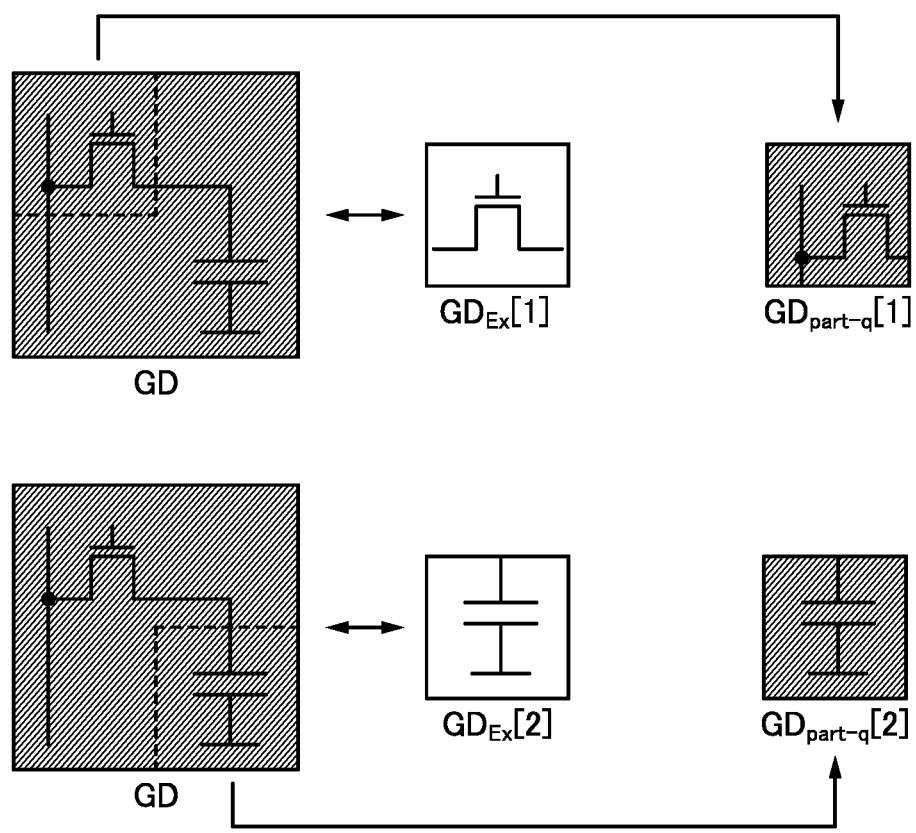
FIG. 15 is a diagram showing an example of an image retrieval method.

FIG. 15 is a diagram showing an example of the operation of Step S13. The image data GD illustrated in FIG. 15 corresponds to a circuit diagram in which a transistor symbol is shown in the upper left and a capacitor symbol is shown in the lower right. An image corresponding to the extracted image data $GD_{Ex}[1]$ includes a transistor symbol, and an image corresponding to the extracted image data $GD_{Ex}[2]$ includes a capacitor symbol.

In the case shown in FIG. 15, the upper left portion of the image corresponding to the image data GD is the area with the highest degree of correspondence to the extracted image data $GD_{Ex}[1]$. Thus, data corresponding to the upper left area of the image data GD is referred to as partial image data $GD_{part-q}[1]$. The lower right portion of the image corresponding to the image data GD is the area with the highest degree of correspondence to the extracted image data $GD_{Ex}[2]$. Thus, data corresponding to the lower right area of the image data GD is referred to as partial image data $GD_{part-q}[2]$. In other words, a plurality of pieces of the partial image data $GD_{part-q}$ are extracted from one piece of the image data GD.

In Step S13, the same number of pieces of the image data as that of the pieces of the extracted image data $GD_{Ex}$ may be extracted from the image data GD as the partial image data $GD_{part-q}$, or the number of pieces of the image data with smaller than that of the pieces of the extracted image data $GD_{Ex}$ may be extracted from the image data GD as the partial image data $GD_{part-q}$. For example, in the case where areas of the image data GD with high degrees of correspondence to a plurality of pieces of the extracted image data $GD_{Ex}$ are the same, the number of pieces of the partial image data $GD_{part-q}$ extracted from the image data GD can be one in that areas. In other words, it is not necessary to extract the plurality of pieces of the same partial image data $GD_{part-q}$.

Note that the extraction of the partial image data $GD_{part-q}$ may be omitted. In this case, the following description can be applied when the partial image data $GD_{part-q}$ is read as the image data GD as appropriate; or the whole image data GD can be regarded as the partial image data $GD_{part-q}$. For example, when the number of pieces of the pixel data included in the image data GD is equal to the number of pieces of the pixel data included in the extracted image data $GD_{Ex}$, the image retrieval method of one embodiment of the present invention can be executed without the extraction of the partial image data $GD_{part-q}$. Even when the number of pieces of the pixel data included in the image data GD is different from the number of pieces of the pixel data included in the extracted image data $GD_{Ex}$, the image retrieval method of one embodiment of the present invention can be executed without the extraction of the partial image data $GD_{part-q}$. In this case, for example, the number of pieces of the pixel data included in one or both of the image data GD and the extracted image data $GD_{Ex}$ is increased or decreased, whereby the image retrieval method of one embodiment of the present invention can be executed.

[Step S14]

Next, the partial image data $GD_{part-q}$ and the extracted image data $GD_{Ex}$ are input to the neural network included in the processing portion 13. The neural network can have the structure illustrated in FIG. 7A or FIG. 7B.

The description of Step S04 can be as appropriate referred to for the operation in Step S14 when the image data GD is rephrased as the partial image data $GD_{part-q}$ and the partial image data $GD_{part}$ is rephrased as the extracted image data $GD_{Ex}$, for example. Note that the image data GD is rephrased as the extracted image data $GD_{Ex}$ and the partial image data $GD_{part}$ is rephrased as the partial image data $GD_{part-q}$ in some cases.

[Step S15]

Next, the output value, which is output from the layer included in the neural network when the extracted image data $GD_{Ex}$ is input to the neural network included in the processing portion 13, is compared with the output value, which is output from the layer included in the neural network when the partial image data $GD_{part-q}$ is input. This allows the calculation of the similarity of the extracted image data $GD_{Ex}$ to the image data $GD_{part-q}$, as a numerical value.

Specifically, similarity of the extracted image data $GD_{Ex}$ to the partial image data $GD_{part-q}$ corresponding to the extracted image data $GD_{Ex}$ is calculated. For example, it is assumed that the image data GD and the extracted image data $GD_{Ex}[1]$ are compared to extract the partial image data $GD_{part-q}[1]$ from the image data GD, and the image data GD and the extracted image data $GD_{Ex}[2]$ are compared to extract the partial image data $GD_{part-q}[2]$ from the image data GD, as illustrated in FIG. 15. In this case, the similarity of the extracted image data $GD_{Ex}[1]$ to the partial image data $GD_{part-q}[1]$ is calculated, for example. The similarity of the extracted image data $GD_{Ex}[2]$ to the partial image data $GD_{part-q}[2]$ is calculated.

In the case where the processing portion 13 includes the neural network 30 having the structure illustrated in FIG. 7A, for example, the output values output from any of the layer 31[1] to the layer 31[m] are compared as in Step S05. For example, the output values output from the layer 31[m] are compared. Note that only the output values of one layer of the layer 31[1] to the layer 31[m] may be compared or the output values of the two or more layers may be compared.

In the case where the processing portion 13 includes the neural network 30a having the structure illustrated in FIG. 7B, for example, output values output from any of the pooling layer PL[1] to the pooling layer PL[m] are compared as in Step S05. For example, the output values from the pooling layer PL[m] are compared. Note that the output values output from any of the convolutional layer PL[1] to the convolutional layer PL[m] may be compared or the output values output from the fully connected layer FCL may be compared.

In this specification and the like, an output value $VGD_{part-q}$ is the output value that is compared as described above, among the output values output from the layer included in the neural network when the partial image data $GD_{part-q}$ is input to the neural network included in the processing portion 13. An output value $VGD_{Ex}$ is the output value that is compared as described above, among the output values output from the layer included in the neural network when the extracted image data $GD_{Ex}$ is input to the neural network included in the processing portion 13. That is, in Step S15, the output value $VGD_{part-q}$ and the output value $VGD_{Ex}$ are compared.

The description of Step S05 can be as appropriate referred to for the operation in Step S15 when the output value VGD is rephrased as the output value $VGD_{part-q}$ and the output value $VGD_{part}$ is rephrased as the output value $VGD_{Ex}$, for example. By performing Step S15, the database image similar to part of the image corresponding to the image data GD can be retrieved.

In the image retrieval system 10, the output values of the layer included in the neural network provided in the processing portion 13 are compared, whereby similarity of the extracted image data $GD_{Ex}$ to the partial image data $GD_{part-q}$ can be calculated with high accuracy in a short time, as described above. Accordingly, the database image similar to part of the image corresponding to the image data GD can be retrieved with high accuracy as compared with the case where the image data GD and the database image data $GD_{DB}$ are compared only by area-based matching, for example. The database image similar to part of the image corresponding to the image data GD can be retrieved in a short time as compared with the case where the image data GD and the database image data $GD_{DB}$ are compared only by feature-based matching, for example. Furthermore, since the above similarity can be calculated as a numerical value, the degrees of correspondence of the database images to the image corresponding to the image data GD can be ranked, for example.

In the image retrieval system 10, the image data GD is compared with the database image data $GD_{DB}$ by area-based matching or the like, and the database image data $GD_{DB}$ with a high degree of correspondence to part of the image data GD is extracted as the extracted image data $GD_{Ex}$. After that, the partial image data $GD_{part-q}$ is extracted from the image data GD, and the partial image data $GD_{part-q}$ and the extracted image data $GD_{Ex}$ are input to the neural network included in the processing portion 13. By the extraction of the database image data $GD_{DB}$ in this manner, it is possible to inhibit input of the database image data $GD_{DB}$, which represents the database image that does not include an image with a high degree of correspondence to part of the image corresponding to the image data GD, to the neural network included in the processing portion 13. Thus, the database image similar to the image corresponding to part of the image data GD can be retrieved with high accuracy in a short time. Note that, for example, in the case where the number of pieces of the database image data $GD_{DB}$ compared with the image data GD is small, the above retrieval can be performed with high accuracy in a short time even without the extraction of the database image data $GD_{DB}$.

EXAMPLE

This example describes the results of retrieval of a database image including a portion similar to an image input to the image retrieval system.

In this example, one image was input to the image retrieval system. After that, 100 database images including a portion similar to the image were retrieved in each of Condition 1 and Condition 2. In both Condition 1 and Condition 2, the image input to the image retrieval system was a circuit diagram, and as the database images, circuit diagrams, graphs, and the like were prepared.

In Condition 1, the image data GD corresponding to the image input to the image retrieval system was compared with the database image data $GD_{DB}$ by area-based matching, and the 100 database images were retrieved in descending order of the correspondence degree.

Figure 16:
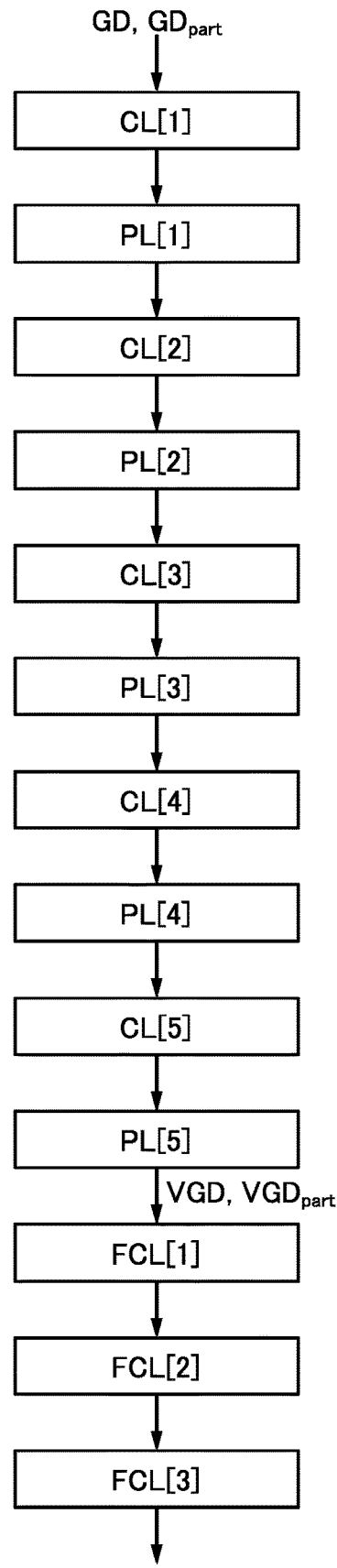
FIG. 16 is a diagram showing a structure of a neural network according to Example.

In Condition 2, the database images including a portion similar to the image input to the image retrieval system were retrieved by the method illustrated in FIG. 2 of Embodiment. Specifically, first, the image data GD was compared with the database image data $GD_{DB}$ by area-based matching, and 400 pieces of the database image data $GD_{DB}$ were extracted as the extracted image data $GD_{Ex}$ in descending order of the correspondence degree. Next, from each of the 400 pieces of the extracted image data $GD_{Ex}$, data of the area with the highest degree of correspondence to the image data GD was extracted as the partial image data $GD_{part}$. Next, as illustrated in FIG. 16, the image data GD and the partial image data $GD_{part}$ were input to the neural network formed of the convolutional layer CL[1] to the convolutional layer CL[5], the pooling layer PL[1] to the pooling layer PL[5], and a fully connected layer FCL[1] to a fully connected layer FCL[3]. Next, the output value VGD, which is the output value output from the pooling layer PL[5] when the image data GD was input to the neural network, was compared with the output values $VGD_{part}$, which are the output values output from the pooling layer PL[5] when the partial image data $GD_{part}$ was input, and similarity was calculated. After that, the 100 pieces of the partial image data $GD_{part}$ were extracted in descending order of the similarity to the image data GD, and the database images including the extracted partial image data $GD_{part}$ were retrieved.

In Condition 1, 6 images of the 100 retrieved database images include the circuit diagram. By contrast, in Condition 2, 30 images of the 100 retrieved database images include the circuit diagram. The above demonstrated that more database images including the portion similar to the image input to the image retrieval system were able to be retrieved in Condition 2 than in Condition 1.

REFERENCE NUMERALS

10: image retrieval system, 11: input portion, 12: transmission path, 13: processing portion, 15: memory portion, 17: database, 19: output portion, 21: compared data area, 30: neural network, 30a: neural network, 31: layer, 32: neuron, 32a: neuron, 32b: neuron, 32c: neuron

The invention claimed is:

1. An image retrieval system comprising a processing circuitry,
wherein the processing circuitry comprises a neural network,
wherein the neural network comprises a convolutional layer and a pooling layer,
wherein the processing circuitry is configured to calculate a degree of correspondence between image data and each area of a plurality of pieces of database image data by area-based matching when the image data and the plurality of pieces of database image data are input to the processing circuitry,
wherein the processing circuitry is configured to extract database image data of the plurality of pieces of database image data based on the degree of correspondence to the image data as extracted image data,
wherein, after extracting the database image data of the plurality of pieces of database image data as extracted image data, the processing circuitry is configured to extract data of an area based on the degree of correspondence to the image data as partial image data from the extracted image data,
wherein, after extracting the partial image data from the extracted image data, the image data and the partial image data are input to a first layer of the neural network,
wherein the pooling layer is configured to output a first output value corresponding to the image data after inputting the image data to the first layer of the neural network,
wherein the pooling layer is configured to output a second output value corresponding to the partial image data after inputting the partial image data to the first layer of the neural network,
wherein the processing circuitry is configured to compare the first output value with the second output value,
wherein, during the area-based matching, a plurality of first pixel data of the image data is compared with a plurality of second pixel data of the plurality of pieces of database image data,
wherein the plurality of first pixel data corresponds to a plurality of pixels of the image data, and
wherein each of the plurality of first pixel data corresponds to a luminance value.

2. The image retrieval system according to claim 1,
wherein the number of pieces of pixel data included in the image data is less than or equal to the number of pieces of pixel data included in the plurality of pieces of database image data,
wherein third pixel data of the plurality of first pixel data and fourth pixel data of the plurality of first pixel data are compared with fifth pixel data of the plurality of second pixel data and sixth pixel data of the plurality of second pixel data,
wherein the degree of correspondence between the third pixel data of the plurality of first pixel data and the fourth pixel data of the plurality of first pixel data and an area formed by the fifth pixel data of the plurality of second pixel data and the sixth pixel data of the plurality of second pixel data is calculated,
wherein the plurality of first pixel data compared with the plurality of second pixel data correspond to a compared data area, and
wherein the compared data area slides one column at a time in the pixel data included in the plurality of pieces of database image data.

3. The image retrieval system according to claim 1, wherein the processing circuitry comprises a transistor.

4. The image retrieval system according to claim 1, wherein the image data and the plurality of pieces of database image data each comprise a symbol.

5. The image retrieval system according to claim 1, wherein the image data and the plurality of pieces of database image data represent a drawing included in intellectual property information.

6. An image retrieval method comprising:
calculating a degree of correspondence between image data and each area of a plurality of pieces of database image data by area-based matching;
extracting database image data of the plurality of pieces of database image data based on the degree of correspondence to the image data as extracted image data;
extracting data of an area based on the degree of correspondence to the image data as partial image data from the extracted image data;
inputting the image data to a neural network comprising a convolutional layer, a fully connected layer, and a plurality of pooling layers so as to acquire a first output value output from one of the plurality of pooling layers;
inputting the partial image data to the neural network so that a second output value output from the one of the plurality of pooling layers is acquired; and
comparing the first output value with the second output value,
wherein an input data value input into the convolutional layer corresponds to a gray level represented by pixel data,
wherein, during the area-based matching, a plurality of first pixel data of the image data is compared with a plurality of second pixel data of the plurality of pieces of database image data,
wherein the plurality of first pixel data corresponds to a plurality of pixels of the image data,
wherein each of the plurality of first pixel data corresponds to a luminance value, and
wherein the luminance value represents a plurality of gray levels.

7. The image retrieval method according to claim 6, wherein the image data comprises a plurality of pieces of pixel data, and
wherein a plurality of pieces of image data that differ in the number of pieces of the pixel data to be provided are generated on the basis of the image data, and then the image data is compared with the plurality of pieces of database image data.

8. The image retrieval method according to claim 6, wherein the image data and the plurality of pieces of database image data each comprise a symbol.

9. The image retrieval method according to claim 6, wherein the image data and the plurality of pieces of database image data represent a drawing included in intellectual property information.

* * * * *